US010108556B2

(12) United States Patent
Kumar et al.

(10) Patent No.: US 10,108,556 B2
(45) Date of Patent: *Oct. 23, 2018

(54) UPDATING PERSISTENT DATA IN PERSISTENT MEMORY-BASED STORAGE

(71) Applicant: Intel Corporation, Santa Clara, CA (US)

(72) Inventors: Sanjay Kumar, Hillsboro, OR (US); Rajesh Sankaran, Portland, OR (US); Subramanya Dulloor, Hillsboro, OR (US); Sheng Li, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 28 days.

This patent is subject to a terminal disclaimer.

(21) Appl. No.: 15/246,811

(22) Filed: Aug. 25, 2016

(65) Prior Publication Data

US 2016/0364340 A1 Dec. 15, 2016

Related U.S. Application Data

(63) Continuation of application No. 14/579,934, filed on Dec. 22, 2014, now Pat. No. 9,430,396.

(51) Int. Cl.
G06F 12/12 (2016.01)
G06F 12/128 (2016.01)
G06F 12/0891 (2016.01)
G06F 3/06 (2006.01)
G06F 12/0808 (2016.01)
(Continued)

(52) U.S. Cl.
CPC .......... *G06F 12/128* (2013.01); *G06F 3/065* (2013.01); *G06F 3/067* (2013.01); *G06F 3/0619* (2013.01); *G06F 3/0653* (2013.01); *G06F 3/0671* (2013.01); *G06F 11/00* (2013.01); *G06F 12/0804* (2013.01); *G06F 12/0808* (2013.01); *G06F 12/0868* (2013.01); *G06F 12/0891* (2013.01); *G06F 12/0895* (2013.01); *G06F 2212/1032* (2013.01); *G06F 2212/621* (2013.01)

(58) Field of Classification Search
None
See application file for complete search history.

(56) References Cited

U.S. PATENT DOCUMENTS 7,461,209 B2   12/2008   Altman et al.
8,396,937 B1 * 3/2013   O'Krafka ............... G06F 13/28
                                                    709/213
(Continued)

OTHER PUBLICATIONS

USPTO, Office Action for U.S. Appl. No. 14/621,654, dated Aug. 25, 2016 (8 pages).
(Continued)

Primary Examiner — Kevin Verbrugge
(74) Attorney, Agent, or Firm — Lowenstein Sandler LLP

(57) ABSTRACT

A processor includes a processing core to execute an application comprising instructions encoding a transaction with a persistent memory via a near memory cache, wherein the near memory cache comprises a cache line comprising an identifier associated with the transaction and a status flag indicating whether the cache line is committed or uncommitted, and a cache controller operatively coupled to the near memory cache to determine, based on the status flag, what operation is to be performed with respect to contents of the cache line.

22 Claims, 13 Drawing Sheets

(51) Int. Cl.
  *G06F 12/0804* (2016.01)
  *G06F 12/0868* (2016.01)
  *G06F 12/0895* (2016.01)
  *G06F 11/00* (2006.01)

(56) References Cited

U.S. PATENT DOCUMENTS

| | | | | |
|---|---|---|---|---|
| 8,996,563 | B2* | 3/2015 | Bender | G06F 17/30306 |
| | | | | 707/769 |
| 9,229,952 | B1* | 1/2016 | Meacham | G06F 17/3023 |
| 9,645,844 | B2* | 5/2017 | Zhang | G06F 9/466 |
| 2005/0033720 | A1* | 2/2005 | Verma | G06F 9/466 |
| 2005/0177774 | A1* | 8/2005 | Copeland | G06F 11/28 |
| | | | | 714/38.1 |
| 2008/0288498 | A1* | 11/2008 | Hinshaw | G06F 17/30575 |
| 2010/0250833 | A1 | 9/2010 | Trika | |
| 2011/0167222 | A1* | 7/2011 | Lee | G06F 3/3004 |
| | | | | 711/118 |
| 2011/0307653 | A1* | 12/2011 | Rudelic | G06F 12/0831 |
| | | | | 711/105 |
| 2012/0179877 | A1* | 7/2012 | Shriraman | G06F 9/524 |
| | | | | 711/141 |
| 2013/0036136 | A1* | 2/2013 | Horii | G06F 9/466 |
| | | | | 707/770 |
| 2014/0304475 | A1 | 10/2014 | Ramanujan et al. | |
| 2014/0365734 | A1* | 12/2014 | Bridge, Jr. | G06F 12/0891 |
| | | | | 711/144 |
| 2015/0006834 | A1 | 1/2015 | Dulloor et al. | |
| 2015/0193264 | A1* | 7/2015 | Hutton | G06F 9/466 |
| | | | | 719/328 |
| 2015/0278281 | A1* | 10/2015 | Zhang | G06F 17/30008 |
| | | | | 707/703 |
| 2015/0378899 | A1* | 12/2015 | Busaba | G06F 12/0808 |
| | | | | 711/130 |
| 2015/0378926 | A1* | 12/2015 | Busaba | G06F 12/0891 |
| | | | | 711/141 |
| 2016/0034225 | A1* | 2/2016 | Yoon | G06F 12/0868 |
| | | | | 711/102 |
| 2017/0097950 | A1* | 4/2017 | Meacham | G06F 17/30309 |
| 2017/0206234 | A1* | 7/2017 | Zhang | G06F 17/30353 |

OTHER PUBLICATIONS

Zhao, Jishen et al. "Kiln: Closing the Performance Gap Between Systems With and Without Persistence Support" MICRO-46, Dec. 7-11, 2013, Davis, CA pp. 421-432.

Venkataraman, Shivaram et al., "Consistent and Durable Data Structures for Non-volatile Byte-addressable Memory", FAST 2011 Proceedings of the 9th USENIX Conference on File and Storage Technologies, Berkeley, CA 2011, 15 pages.

* cited by examiner

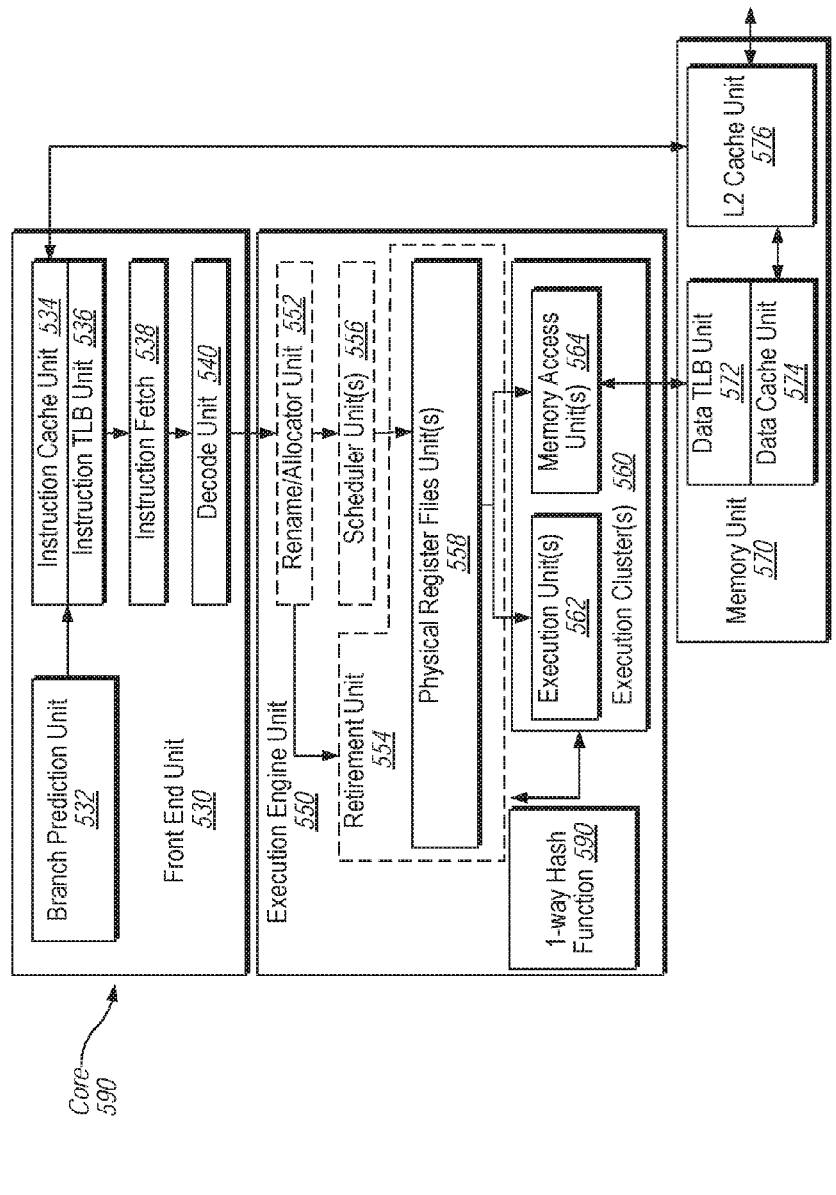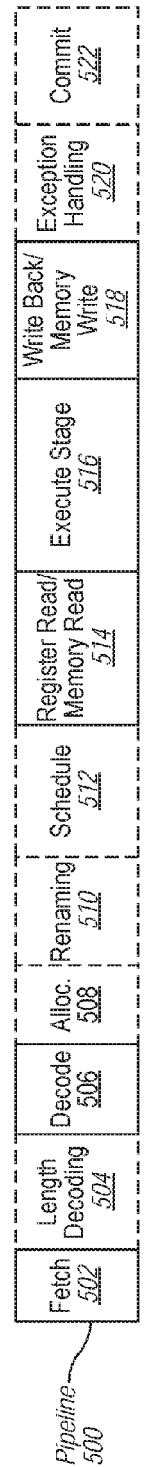
FIG. 5A
FIG. 5B

UPDATING PERSISTENT DATA IN PERSISTENT MEMORY-BASED STORAGE

This application is a continuation of U.S. patent application Ser. No. 14/579,934, filed on Dec. 22, 2014, now U.S. Pat. No. 9,430,396, issued Aug. 30, 2016, the entirety of which is incorporated herein by reference.

TECHNICAL FIELD

The embodiments of the disclosure relate generally to managing persistent memory and, more specifically, to providing in-place consistent updates to data stored in persistent memory.

BACKGROUND

Persistent memory is a type of memory device that exhibits both the properties of memory and storage. Similar to memory, the persistent memory may be addressed at the byte level by central processing unit (CPU) load and store instructions with performance close to the memory (typically, at 2-5× slower than dynamic random-access memory (DRAM)). Similar to storage, the persistent memory is non-volatile in the sense that data stored on the persistent memory is retrievable even when the persistent memory is powered off. A CPU may use the persistent memory as a data store and execute atomic data transactions to modify data stored on the persistent memory.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5A is a block diagram illustrating a micro-architecture for a processor including heterogeneous core in which one embodiment of the disclosure may be used.

FIG. 5B is a block diagram illustrating an in-order pipeline and a register renaming stage, out-of-order issue/execution pipeline implemented according to at least one embodiment of the disclosure.

DETAILED DESCRIPTION

Atomicity with respect to a transaction ensures that the data stored in the persistent memory always remain in a consistent state even in the event of power or system failures. Atomicity of a transaction guarantees that the transaction completes or has no effect. Atomicity is a common feature for storage systems including persistent memory. However, due to power or system failures, a transaction may be only partially completed, thus violating the atomicity of the transaction and leaving the content of persistent memory in a potentially inconsistent state. To prevent such condition from happening, the persistent transactions may need to include certain consistency mechanisms to preserve atomicity of a transaction to persistent memory. Typical consistency mechanisms include journaling, copy-on-write (CoW), and log-structured mechanism. These consistency mechanisms are software-based approaches that may cause significant performance overhead to underlying transactions. Additionally, race conditions may also occur if the data stored on the persistent memory is also accessed by other components (e.g., other CPUs, I/O devices, etc.) while the CPU performs a transaction (e.g., other components accessing partial updates). This may cause the output of the transaction being partially visible to other parts of the system and hence violate the transaction atomicity. To prevent the race condition from happening, the persistent transactions may need to include lock mechanisms.

Embodiments of the present disclosure significantly reduce the overhead to maintain the consistency of transactions with persistent memory of processing systems including two or more levels of memory. The processing systems described herein may take advantage of certain properties of a first level memory (e.g., a near memory cache (NMC)) to record an implicit log of transactions with a second level memory (e.g., the persistent memory), thus eliminating the need for explicit software-based consistency mechanisms (e.g., journaling or CoW).

Figure 1A:
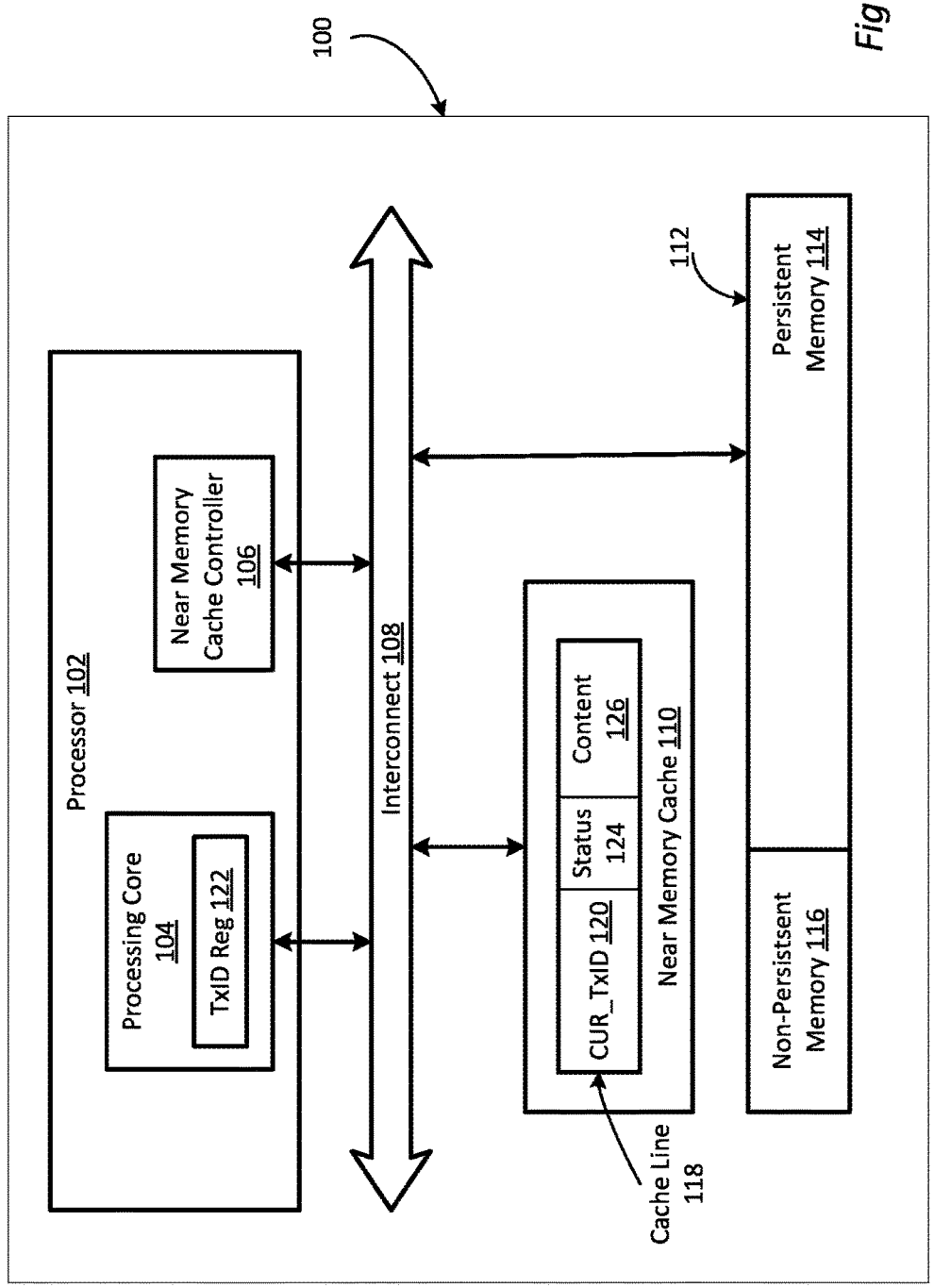
FIG. 1A illustrates a processing system including two-level memory according to an embodiment of the present disclosure.

FIG. 1A illustrates a processing system 100 including a two-level memory according to an embodiment of the present disclosure. In one embodiment, the processing system 100 may be implemented as a system-on-a-chip (Soc). The processing system 100 may include a processor 102 (such as a CPU) and a two-level memory that may include a first level memory 110 (hereafter referred to as the near memory cache due to its proximity to the processing core and being used as a cache for far memory) and a second level memory 112 (hereafter referred to as the far memory). In one embodiment, the first level memory may include volatile memory (such as volatile DRAM) implemented to function as a software-transparent near memory cache 110. In one embodiment, the near memory cache may be a last level cache (LLC) associated with the processor 102. The second level memory 112 may be software-visible and may include both persistent memory 114 and non-persistent memory 116 (such as a volatile memory). The processor 102, the near memory cache 110, and the far memory 112 are communicatively connected via an interconnect 108.

In one embodiment, the processor 102 may include a processing core 104 and a near memory cache controller (hereafter referred to as "cache controller") 106. The processing core 104 may execute tasks including applications of different priority levels. For example, the processing core 104 may execute the kernel of an operating system (OS) having a priority level of the supervisor and/or user applications having a priority level of the user. The applications executed by the processing core 104 may include transactions with the persistent memory 114. As discussed above, these transactions should be executed in atomic manners that ensure consistent states of data stored in the persistent memory 114.

In one embodiment, the near memory cache 110 is implemented as a cache to the far memory including the persistent memory 114 and the non-persistent memory 116. The near memory cache 110 may cache data relating to the transactions with the persistent memory 114 originated from the processing core 104 or from other processing cores that are capable of executing transactions with the persistent memory 114. In one embodiment, the cache controller 106 is a logic circuit that monitors the transactions at the persistent memory 114 and correspondingly, cache data relating to the transactions in the near memory cache 110. In one embodiment, in response to detecting a request to write data to the persistent memory 114, the cache controller 106 may cause the data to be written in the near memory cache 110 before the data is written to the persistent memory 114. In response to detecting a request to read data from the persistent memory 114, the cache controller 106 may search the data in the near memory cache 110. If the data is present in the near memory cache 110, the cache controller 106 may cause the processing core 104 to retrieve the data from the near memory cache 110. If the data is not found in the near memory cache 110, the cache controller 110 may cause the processing core 104 to retrieve the data from the persistent memory 114.

In one embodiment, the near memory cache 110 is configured to support flush-on-fail (FoF) for data stored therein. Data stored in the FoF near memory cache 110 is guaranteed to be flushed to the persistent memory 114 prior to any reset of the processing system 100. This FoF feature makes the near memory cache 110 persistent in the sense that the data stored in the near memory cache 110 is guaranteed to have a chance to be flushed to the persistent memory 114. The flush-on-fail feature of the near memory cache 110 makes it a persistent cache because any dirty cache lines (those that have not written out to the persistent memory) for the persistent memory 106 are guaranteed to have a chance to be written out to the persistent memory 106 during a system reset. The flush from the near memory cache 110 to the persistent memory 106 may be achieved by explicit flush command, eviction command, or flush responsive to a power or system failure event. The power failure event occurs when the processing system 100 suddenly loses electrical power, and the processing system 100 is shutting down due to the loss of power. The system failure event occurs when any hardware or software components of the processing system 100 fail to function properly and cause the processing system 100 to malfunction.

In one embodiment, the cache controller 106 may cause the near memory cache 110 to function as a redo log (a file that logs the history of all changes made to the persistent memory 114) so that applications being executed by the processing core 104 may perform consistent updates to the persistent memory 114. In one embodiment, the processing core may support certain instructions that specify the beginning (e.g., PXBEGIN instruction), the end (PXEND instruction), or an abort (PXABORT instruction) of a transaction. The software applications may use these instructions to turn the near memory cache 110 into a redo log, thus eliminating the overhead associated with using the software approaches such as journaling, CoW, and log structure mechanism to ensure consistency. The near memory cache 110 may achieve performance close to volatile memory updates (or in-place updates).

In one embodiment, the PXBEGIN instruction defines the beginning of a persistent transaction of software applications (or threads), and the PXEND instruction defines the end of the transaction of the software applications (or threads). The PXABORT instruction may be used to abort the transaction at any point between a pair of PXBEGIN and PXEND instructions.

Figure 1B:
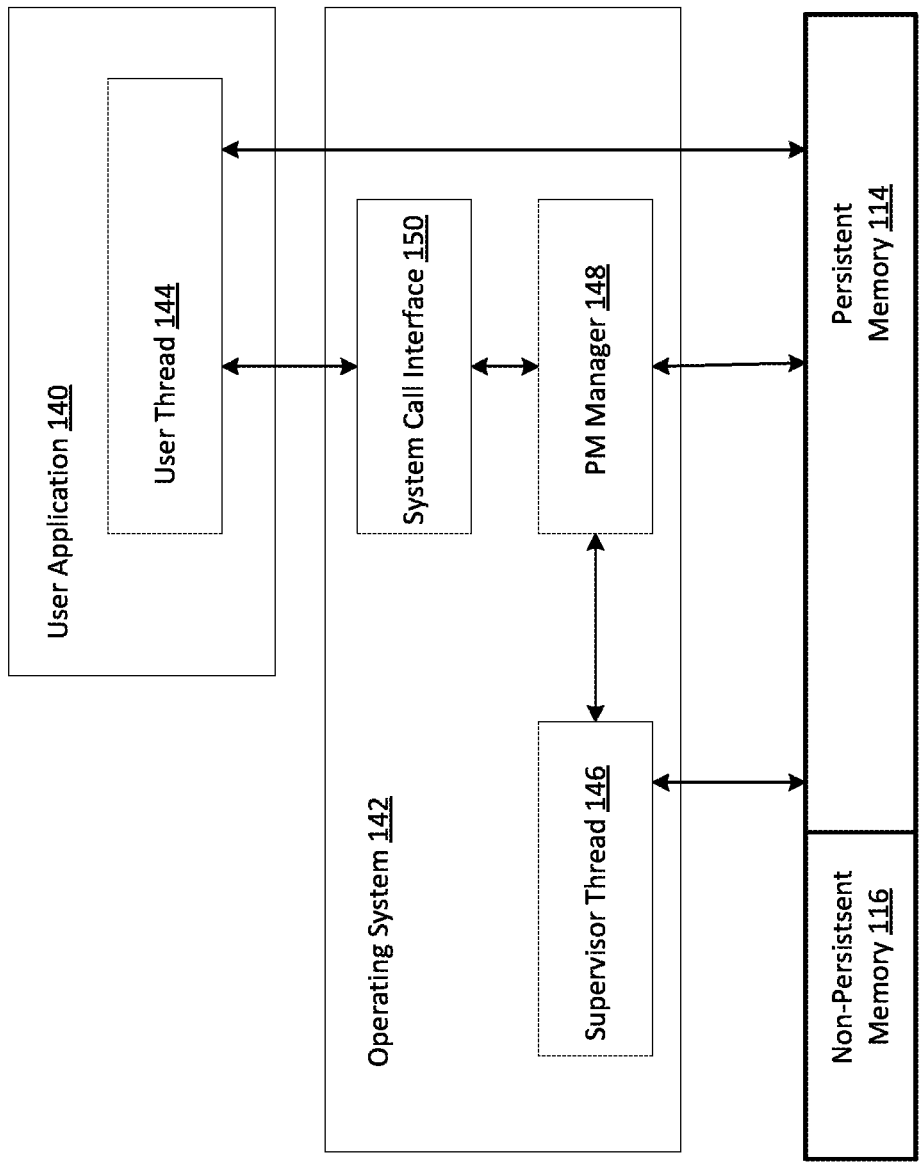
FIG. 1B illustrates an operating system managing the persistent memory according to an embodiment of the present disclosure.

In one embodiment, the processing core 104 may include a transaction identifier register 122 to store a transaction identifier associated with a transaction. The transaction identifier register may be one of machine specific registers (MSRs) of the processing core 104. Before a software application executes the PXBEGIN to start the transaction, the software application may make a request to the operating system to allocate a transaction identifier (TxID) for the software application. In one embodiment, the request may be made in the form of a system call to the kernel of the operating system (OS). The system call may be made to a persistent memory (PM) manager in the OS kernel. FIG. 1B illustrates an operating system 142 managing the persistent memory according to an embodiment of the present disclosure. As shown in FIG. 1B, a user application 140 may include a user thread 144 that may use memory resources (e.g., persistent memory 114 and non-persistent memory 116) through operating system 142. The operating system 142 may include a kernel executing supervisor thread 146, a persistent memory manager 148, and a system call interface 150. The user thread 144 may execute system calls, via the system call interface 150, to the persistent memory (PM) manager 148. Upon receiving the request either from the user thread 144 or the supervisor thread 146, the PM manager 148 may execute a transaction identifier allocation function call (e.g., pm_txid_alloc( )) to allocate a unique and free TxID and store it in the transaction identifier register 122. In one embodiment, in the event that PXBEGIN is executed prior to allocating a TxID to the software application, the CPU fault may occur, thus stopping the transaction.

Figure 2A:
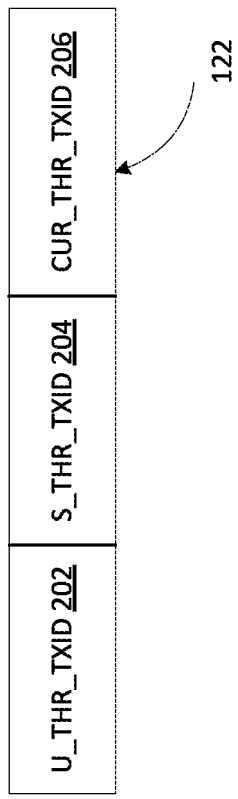
FIG. 2A illustrates content of transaction identifier register according to an embodiment of the present disclosure.

In one embodiment, the context of a software application may be extended to include OS-visible fields designated to user-level applications, supervisor-level applications, and a currently executing application. For example, the thread context may be extended to include a U_THR_TXID field, a S_THR_TXID field, and a THR_CUR_TXID field to specify correspondingly, a user transaction identifier, a supervisor transaction identifier, and a current transaction identifier. Correspondingly, as shown in FIG. 2A, the TxID register 122 may include a U_THR_TXID field 202, a S_THR_TXID field 204, and a THR_CUR_TXID field 206. In response to a system call, the PM manager may allocate a first TxID for a transaction of user-level thread and store the user-level TxID in the U_THR_TXID field 202 of the TxID register 122, and allocate a second TxID for a transaction of supervisor-level thread and store the TxID in a S_THR_TXID field 204 of the TxID register. The TxID of the current ongoing transaction is stored in the THR_CUR_TXID field 206 of the TxID register 122. If there is no currently ongoing transaction, the THR_CUR_TXID field 206 may store a value of zero. The values stored in the U_THR_TXID field 202, S_THR_TXID field 204, and THR_CUR_TXID field 206 may be changed in response to a context switch (or switching from one running thread to another running thread).

Prior to executing a PXBEGIN instruction to initiate a persistent memory transaction, the software application may make a system call to allocate a TxID and store it in the U_THR_TXID field 202. During the execution of PXBEGIN instruction in the user application to initiate the persistent memory transaction, the processing core 104 may copy the value stored in the U_THR_TXID field 202 to the THR_CUR_TXID field 206. Subsequently, the cache controller 106 may tag any data flush operations from the near memory cache 110 to the persistent memory 114 with the TxID stored in the THR_CUR_TXID field 206. The data flush operations may include cache line write back (CLWB), cache line flush (CLFLUSHOPT/CLFLUSH), and non-temporal stores.

A kernel (or a user application running in the context of a kernel) may request the PM manager to allocate the TxID and store in the S_THR_TXID field 204. During the execution of PXBEGIN instruction in the kernel (or in the context of a kernel), the value stored in the S_THR_TXID field 204 may be copied to the THR_CUR_TXID field 206 so that the cache controller 106 may tag any data flush operations with the TxID stored in the THR_CUR_TXID field 206. If the PXBEGIN is executed prior to the U_THR_TXID field 202 or the S_THR_TXID field 204 is set, a CPU fault may occur.

In one embodiment, the U_THR_TXID and/or the S_THR_TXID may be allocated in a delayed manner. When the PM manager executes a function call of pm_txid_alloc( ), the function call pm_txid_alloc( ) does not allocate or set the U_THR_TXID field 202. Instead, pm_txid_alloc( ) records the allocation request. In response to executing the PXBEGIN instruction, a CPU fault signal may be generated due to the missing of U_THR_TXID and/or the S_THR_TXID. In response to detecting the CPU fault signal, the PM manager may finally allocate the TxID and set the U_THR_TXID field 202 in the TxID register 122.

In one embodiment, the U_THR_TXID field 202 may further include a valid flag to indicate whether the U_THR_TXID is allocated, and an in-use flag to indicate whether the U_THR_TXID is being used. When the PM manager cannot find a free TxID by calling pm_txid_alloc( ) because all TxIDs have been allocated by other threads, the PM manager may reclaim allocated but not in-use TxID from other threads. For example, the PM manager may identify a thread that is not in-use (in-use bit=0), set the valid flag of the thread to 0, indicating an invalid state, and allocate the TxID of the not in-use thread to the current thread. The PM manager may also cause other threads to complete their transactions or terminate misbehaving threads to free up their TxIDs.

Figure 2B:
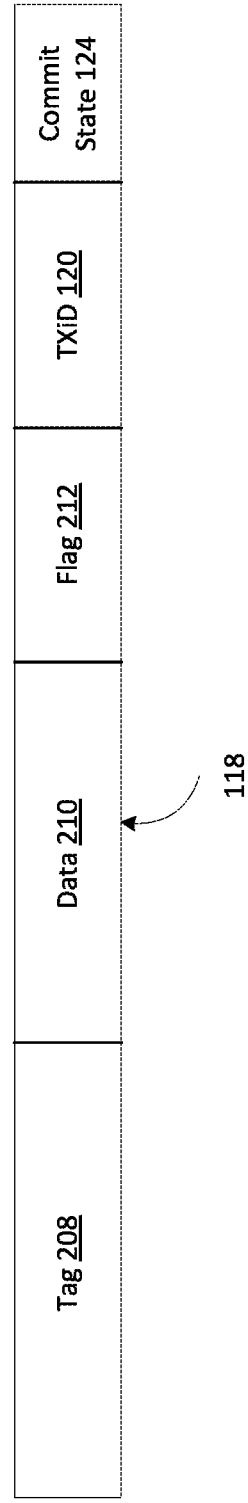
FIG. 2B illustrates a cache line of a cache according to an embodiment of the present disclosure.

In one embodiment, the near memory cache 110 may include one or more cache lines 118. FIG. 2B illustrates an exemplary cache line 118 including a tag field 208, a data field 210, and a flag field 212. The data field 210 may store a copy to be written to the persistent memory 114. The tag field 208 may store the address of the persistent memory at which the data in the data field 210 is to be stored. The flag 212 field may include a status flag whose value indicates a commit state of the cache line according to a certain cache coherence protocol to ensure that the access to the cache line 118 and the corresponding data in the main memory is consistent and correct.

In one embodiment, the cache line 118 may include the transaction identifier TxID field 120 that may uniquely identify a currently executed thread (or THR_CUR_TXID). The cache controller 106 may provide a parameter to define the number of bits in the TxID section, which, in turn, specifies the maximum number of unique transaction identifiers that can concurrently exist (e.g., 8-bit TxID section allows for 255 parallel transactions). The OS may use the maximum number of transaction identifiers to track allocated and free TxIDs. For example, the OS may maintain a bit vector (e.g., 256 bit long) to track free TxIDs.

In one embodiment, the cache controller 106 may tag all cache line flushes (CLWB/CLFLUSHOPT) and non-temporal stores by software applications or threads to the persistent memory 114 with a corresponding transaction identifier stored in the TxID field 120. A cache line is dirty if the cache line is written to, but the content of the cache line is not flushed out to the persistent memory yet. A cache line is not dirty if the content of the cache line is flushed to the persistent memory (i.e., the content of the cache line is the same as that stored in the persistent memory) or if the cache line is not flushed to the persistent memory yet but the corresponding persistent memory location has not been written by another transaction. Thus, the content of dirty cache lines is different from the data stored at the corresponding address of the persistent memory.

In one embodiment, the cache line 118 may include a status flag 124 to indicate a commit state of the cache line 118 with respect to a persistent memory transaction. The state may be free, uncommitted, or committed. A cache line is associated with a free state if the cache line is not dirty, or the cache line is dirty but the cache line caches for the non-persistent (or volatile) memory 116, or the cache line is dirty but the cache line caches for the persistent memory 114 and the store/flush occur outside of a transaction defined by a PXBEGIN/PXEND pair (i.e., the persistent memory is written to by another transaction prior to the execution of PXBEGIN or after the execution of PXEND of the present transaction associated with the cache line). In one embodiment, the cache controller may set the value stored in the TxID field 120 of a free cache line 118 to zero.

The cache line is associated with an uncommitted state if the cache line caches for the persistent memory 114 and a store or flush operation by another transaction occurs between the PXBEGIN/PXEND pair of the present transaction. Since the PXEND has not been executed, the cache line is not committed. The cache controller 106 may set the value in the TxID field 120 of an uncommitted cache line to non-zero and set the status flag 124 to zero. The uncommitted state indicates that the content of the cache line is different from that stored at the corresponding location of the persistent memory, or the content of the cache line needs to write back to the persistent memory. The uncommitted state may transition to a committed state during a commit operation (e.g., PXEND). The commit operation may cause the cache controller 106 to set the status flag 124 to one. Conversely, a committed cache line may transition to the uncommitted state (e.g., if written again by another ongoing transaction) or to the free state (e.g., if evicted to the persistent memory). In one embodiment, an uncommitted cache line may not be evicted except for situations where a near memory cache overflow occurs. The overflow situation is handled as described below.

In one embodiment, in response to executing a PXEND instruction by a task (such as an application or a thread), all the uncommitted cache lines belonging to the transaction are identified and set to the committed state atomically. The atomicity is guaranteed by the flush-on-fail feature of the near memory cache 110 as described above.

In one embodiment, a memory data structure may be used to facilitate the process to identify uncommitted cache lines of a transaction. In one embodiment, the cache controller 106 may be operatively coupled to a data store (not shown) to store a hash table which stores the dirty cache lines associated with transactions executed on the processing core 104. The hash table may include entries indexed according to transaction identifiers TxIDs. In one embodiment, all dirty cache lines of a transaction may be chained together in a linked list whose head may be stored in a hash table entry identified by the TxID associated with the transaction. The linked list may include a chain of link pointers that store the location of the next dirty and uncommitted cache lines in the link list. For example, 64-byte blocks may be used to store multiple addresses of dirty cache lines of the transaction and the last field in the block points to a next 64-byte block. The cache controller 106 may monitor the cache line flushes (e.g., by CLWB/CLFLUSHOPT instructions) and non-temporal stores, and store the link pointer to the cache line in the hash table. In one embodiment, the cache controller 106 is configured to ensure that the uncommitted cache lines are discarded in response to detecting a system failure event and not to flush the uncommitted cache lines to the persistent memory 114 during the flush-on-fail operation.

In one embodiment, a software application may issue the PXABORT instruction to abort a currently running transaction. In response to receiving the PXABORT instruction, the processing core may send an ABORT message to the cache controller 106 with the TxID stored in the THR_CUR_TXID field 206. The cache controller 106 may identify all the dirty cache lines in the near memory cache 110 (e.g., using the hash table) and invalidate these cache lines by setting a valid bit of the cache liens to an invalid state. Additionally, the near memory cache controller 106 may free the hash table entries and the TxID fields used by these invalidated cache lines for other applications (or threads) to use. The processing core 104 may also clear the THR_CUR_TXID field 206.

Figure 3:
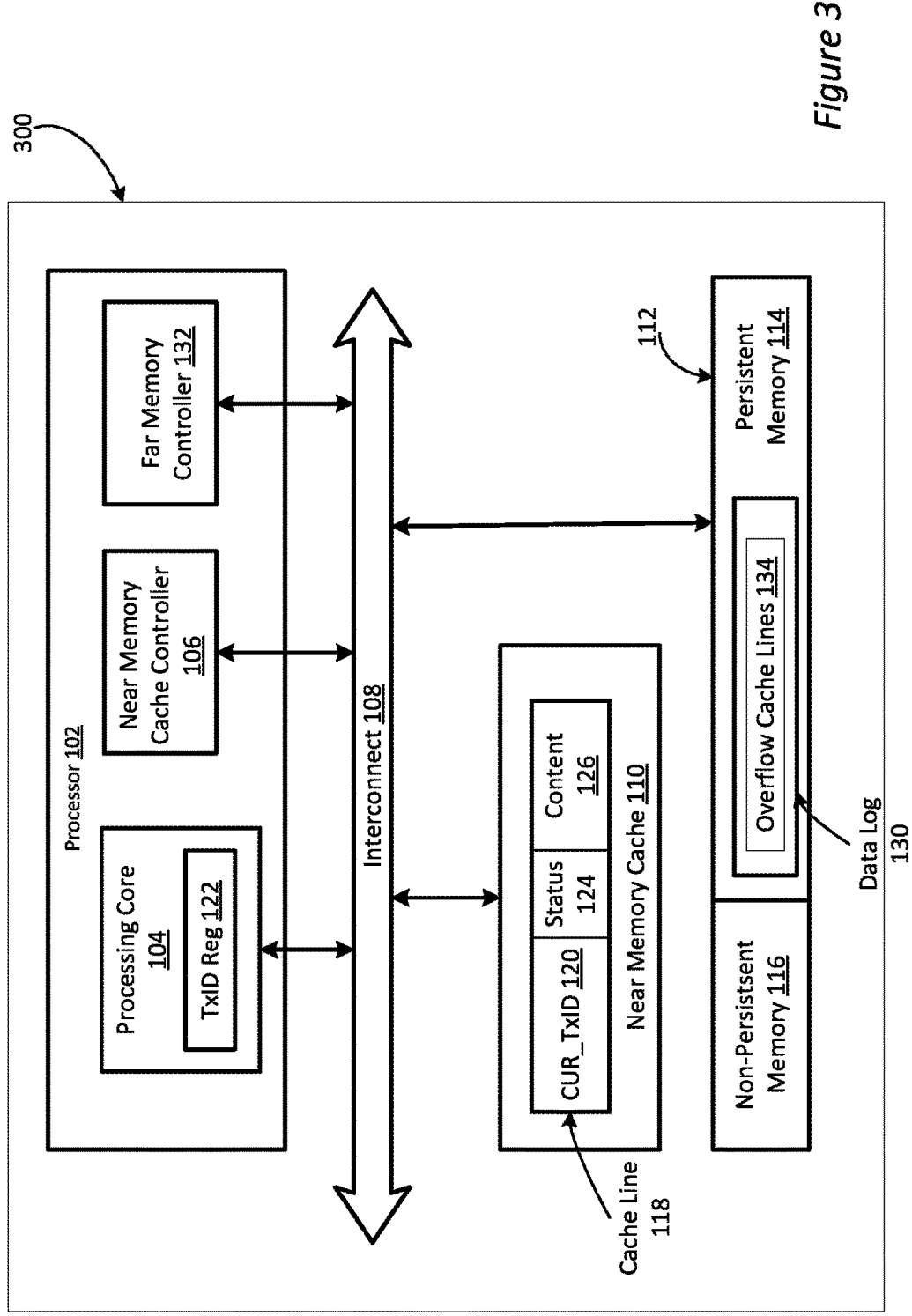
FIG. 3 illustrates a processing system including two-level memory according to another embodiment of the present disclosure.

A near memory cache overflow occurs when the near memory cache 110 does not have enough cache lines to store the uncommitted cache lines for write transactions to the persistent memory 114. Instead of aborting the on-going transactions when a near memory cache overflow occurs, embodiments of the present disclosure may evict the cache lines in the near memory cache 110 to the far memory (e.g., the persistent memory 114). FIG. 3 illustrates a processing system 300 that may handle the near memory cache overflows according one or more embodiments of the present disclosure. As shown in FIG. 3, the processing system 300 may include similar components as those shown in FIG. 1A. Additionally, the persistent memory 114 may include a data log 130 to store the evicted cache lines due to the near memory cache overflow, and the processor 102 may include a far memory controller 132 to manage the data log 130 stored in the far memory (e.g., the persistent memory 114). Alternatively, a persistent memory controller of a memory module on which the persistent memory 114 resides may manage the data log 130.

In one embodiment, the data log 130 may include an undo log to record the overflown cache lines 134 evicted from the near memory cache 110. Before an overflow cache line is evicted to the far memory (e.g., the persistent memory 114), the original content at the corresponding location in the far memory is copied to the undo log. The cache controller 106 may record the transaction identifiers (TxIDs) of overflown transactions and transmit these TxIDs to the far memory controller 132 (hereafter referred to as "memory controller 132"). The memory controller 132 may then store the TxIDs of the overflown transactions in corresponding entries of the undo log.

In one embodiment, the hash table of the TxIDs may include an overflow status flag that may be set by the cache controller 106 to indicate that an overflow has occurred. In response to detecting a commit operation, the cache controller 106 may examine the overflow bit. In response to determining that the overflow bit is set (i.e., indicating that an overflow has already occurred), the cache controller 106 may instruct the memory controller 132 to command the undo log to commits the overflown cache lines stored in the undo log for the transaction. In one embodiment, in response to detecting a system failure event during the transaction that overflows the near memory cache 110, the memory controller 132 may use the undo log may roll back the original content in the far memory by restoring the original content stored in the overflow cache lines. Evicted cache lines that have been written or read again during the transaction may be treated as if they are non-evicted cache lines.

In one embodiment, the memory controller 132 may be used to implement the undo log. The far memory controller 132 may keep a journal of the overflown cache lines evicted into the undo log. In response to a commit event or an abort event, the cache controller 106 may command the memory controller 132 to commit or abort the cache lines in the undo log for the transaction. In another embodiment, the persistent memory manager in the OS may implement the undo log. In response to a near memory cache overflow, an interrupt may be generated by the cache controller 106 to the persistent memory manager which performs journaling for the original content of the overflown cache line into the undo log, followed by the actual eviction. In response to a commit event or an abort event, the cache controller 106 may generate another interrupt to the persistent memory manager to instruct the persistent memory manager to commit or abort the overflown cache lines of the transaction stored in the undo log.

In one embodiment, the data log may be implemented as a redo log. Similarly, the redo log may be implemented using the memory controller 132. The memory controller 132 may add the overflown cache lines (including their values) and their corresponding memory addresses to the redo log during the eviction. During commit or abort, in response to the cache controller's command, the memory controller 132 also commits or aborts the cache lines stored in the redo log for the associated transaction. At commit, the far memory controller 132 may apply the changes logged in the redo log to the corresponding memory locations. At abort, the far memory controller 132 may simple discard the incomplete redo log.

In one embodiment, the redo log may be implemented using the persistent memory manager of the operating system similar to the undo log as discussed above. When overflown cache lines evicted into the redo log are read again during the same transaction, the memory controller 132 or the persistent memory manager may return the data from the redo log. For read operations by overflown transactions, the cache controller 106 may issue the read operations with a special indicator (e.g., a flag bit) and the corresponding TxID to the memory controller 132 or the persistent memory manager which may store the data using the redo log in the persistent memory.

The overflow of cache lines causes the eviction of selected blocks of cache lines into the persistent memory. In one embodiment, the evicted blocks of cache lines are selected according to an eviction policy. In one embodiment, the cache controller 106 may choose to evict cache lines of a transaction based on the resources used by the transaction. For example, the cache controller 106 may choose the transaction holding the largest number of dirty cache lines in a set of transactions as the target for eviction to the data log in the persistent memory 114. This has the benefit of preventing the transaction with heavy writes and large datasets from seizing resources of the cache controller 106. As a result, the rate of overflow occurrence for subsequent transactions may be reduced.

In one embodiment, a first ongoing transaction may include instructions to call for a second transaction prior to the commitment of the first transaction. The first transaction is an outer transaction, and the second transaction is the inner transaction. In this situation, the inner transaction and the outer transaction are independently atomic. In one embodiment, the context fields U_THR_TXID 202 and S_THR_TXID 204 may be extended into arrays that include one or more entries to support multiple layers of transaction nesting. In one embodiment, the U_THR_TXID and S_THR_TXID may each have N elements to support N layers of nesting. The software application may request the persistent memory manager to pre-allocate a number of TxIDs (e.g., M TxIDs) for N levels of nesting. The persistent memory manager may allocates M TxIDs and set them in the U_THR_TXID and S_THR_TXID arrays. During the execution of the nested transactions, in response to the execution of a first PXBEGIN instruction, the processing core 104 may copy a first element in the U_THR_TXID array (for a user application) or in the S_THR_TXID array (for a supervisor application) to the THR_CUR_TXID field 206. In response to the execution of a second PXBEGIN instruction within the first transaction initiated with the first PXBEGIN instruction, the processing core 104 may copy a second element in the U_THR_TXID array or the S_THR_TXID array to the THR_CUR_TXID field 206. In response to the execution of a PXEND or PXABORT instruction, the processing core 104 may set the THR_CUR_TXID field 206 to a previous element of the U_THR_TXID array or the S_THR_TXID array, or to zero if the current transaction is the outermost transaction among the nesting transactions. In one embodiment, the OS may issue a PXABORT to terminate all the running transactions in the U_THR_TXID array and the S_THR_TXID array.

Figure 4:
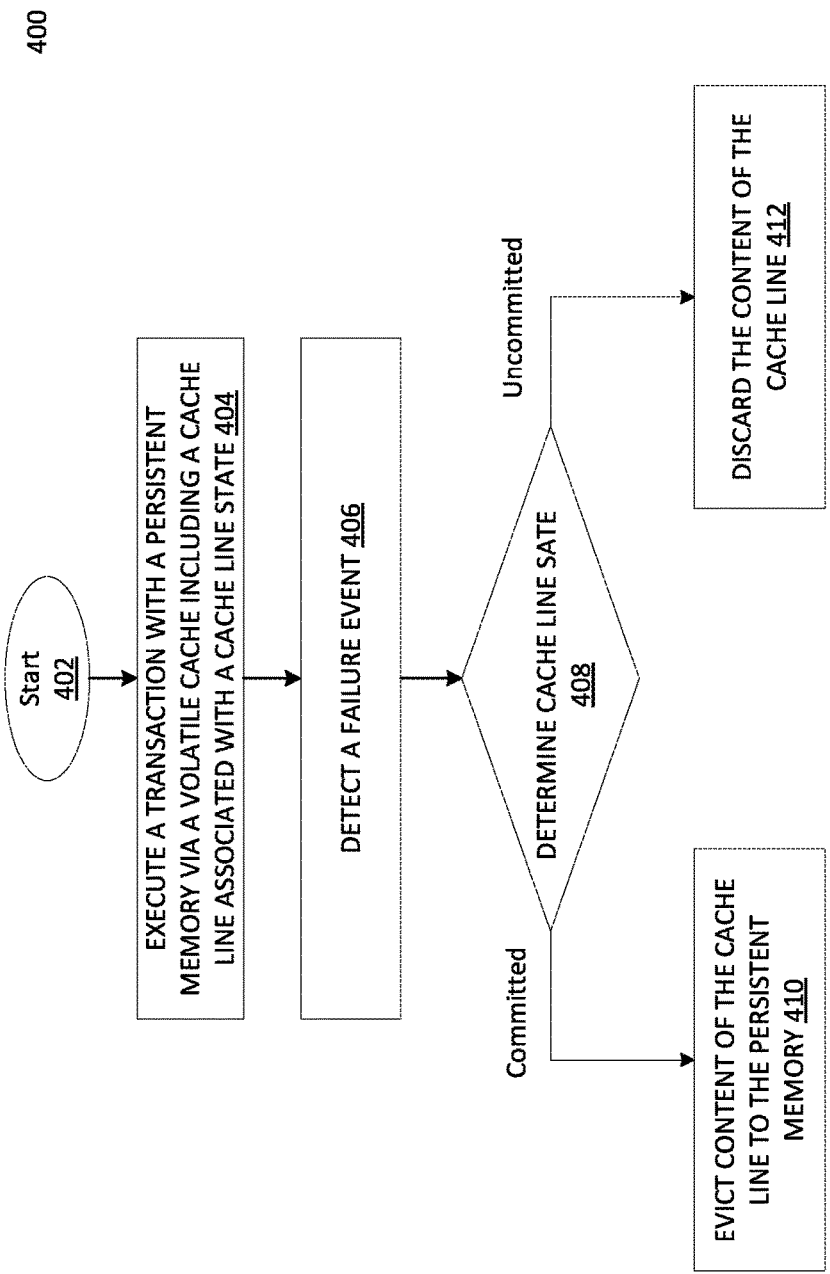
FIG. 4 is a block diagram of a method to consistently manage a two-level memory including a persistent memory according to an embodiment of the present disclosure.

FIG. 4 is a block diagram of a method 400 to provide consistent updates to persistent memory according to an embodiment of the present disclosure. Method 400 may be performed by processing logic that may include hardware (e.g., circuitry, dedicated logic, programmable logic, microcode, etc.), software (such as instructions run on a processing device, a general purpose computer system, or a dedicated machine), firmware, or a combination thereof. In one embodiment, method 400 may be performed, in part, by processing logics of the processor 102 including processing core 104 and cache controller 106 as shown in FIG. 1A.

For simplicity of explanation, the method 400 is depicted and described as a series of acts. However, acts in accordance with this disclosure can occur in various orders and/or concurrently and with other acts not presented and described herein. Furthermore, not all illustrated acts may be performed to implement the method 400 in accordance with the disclosed subject matter. In addition, those skilled in the art will understand and appreciate that the method 400 could alternatively be represented as a series of interrelated states via a state diagram or events.

Referring to FIG. 4, at 402, the operations start. At 404, the processing core 104 of a processor 102 may execute a task including instructions encoding a transaction with a persistent memory (e.g., persistent memory 114 of far memory 112) via a volatile cache (e.g., the near memory cache 110). The volatile cache may include a cache line to cache data for the transaction with the persistent memory. The cache line may include a status flag to indicate whether the cache line is committed or uncommitted.

A cache controller 106 of the processor 102 may monitor the transaction between the processing core 104 and the persistent memory 114. The start of the transaction may be marked by the execution of a PXBEGIN instruction. The transaction may commit by the execution of a PXEND instruction. As discussed before, the cache line may be in a commit state or an uncommitted state. At 406, the cache controller may detect the occurrence of a failure event (e.g., a system failure or power failure).

At 408, the cache controller 106 may determine whether the cache line is in the committed or uncommitted state based on the value stored in the cache line status flag. The cache line status may have been set by the cache controller according to writes to the persistent memory. The value of the cache line status flag may indicate one of free, uncommitted, or committed state.

In response to determining that the cache line is in the committed state, at 410, the cache controller 106 may evict the content stored in the cache line for the transaction to the persistent memory 116. In response to determining that the cache line is uncommitted, at 412, the cache controller 106 may discard the content of the cache line, thus preventing the copy of data from uncommitted cache to the persistent memory. Thus, the content stored in the near memory cache 110 is guaranteed to be consistent with the data stored in the persistent memory 114.

FIG. 5A is a block diagram illustrating a micro-architecture for a processor 500 that implements the processing device including heterogeneous cores in accordance with one embodiment of the disclosure. Specifically, processor 500 depicts an in-order architecture core and a register renaming logic, out-of-order issue/execution logic to be included in a processor according to at least one embodiment of the disclosure.

Processor 500 includes a front end unit 530 coupled to an execution engine unit 550, and both are coupled to a memory unit 570. The processor 500 may include a reduced instruction set computing (RISC) core, a complex instruction set computing (CISC) core, a very long instruction word (VLIW) core, or a hybrid or alternative core type. As yet another option, processor 500 may include a special-purpose core, such as, for example, a network or communication core, compression engine, graphics core, or the like. In one embodiment, processor 500 may be a multi-core processor or may part of a multi-processor system.

The front end unit 530 includes a branch prediction unit 532 coupled to an instruction cache unit 534, which is coupled to an instruction translation lookaside buffer (TLB) 536, which is coupled to an instruction fetch unit 538, which is coupled to a decode unit 540. The decode unit 540 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 540 may be implemented using various different mechanisms. Examples of suitable mechanisms include, but are not limited to, look-up tables, hardware implementations, programmable logic arrays (PLAs), microcode read only memories (ROMs), etc. The instruction cache unit 534 is further coupled to the memory unit 570. The decode unit 540 is coupled to a rename/allocator unit 552 in the execution engine unit 550.

The execution engine unit 550 includes the rename/allocator unit 552 coupled to a retirement unit 554 and a set of one or more scheduler unit(s) 556. The scheduler unit(s) 556 represents any number of different schedulers, including reservations stations (RS), central instruction window, etc. The scheduler unit(s) 556 is coupled to the physical register file(s) unit(s) 558. Each of the physical register file(s) units 558 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. The physical register file(s) unit(s) 558 is overlapped by the retirement unit 554 to illustrate various ways in which register renaming and out-of-order execution may be implemented (e.g., using a reorder buffer(s) and a retirement register file(s), using a future file(s), a history buffer(s), and a retirement register file(s); using a register maps and a pool of registers; etc.).

In one implementation, processor 500 may be the same as processor 102 described with respect to FIG. 1A.

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 554 and the physical register file(s) unit(s) 558 are coupled to the execution cluster(s) 560. The execution cluster(s) 560 includes a set of one or more execution units 562 and a set of one or more memory access units 564. The execution units 562 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 556, physical register file(s) unit(s) 558, and execution cluster(s) 560 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 564). It should also be understood that where separate pipelines are used, one or more of these pipelines may be out-of-order issue/execution and the rest in-order.

The set of memory access units 564 is coupled to the memory unit 570, which may include a data prefetcher 580, a data TLB unit 572, a data cache unit (DCU) 574, and a level 2 (L2) cache unit 576, to name a few examples. In some embodiments DCU 574 is also known as a first level data cache (L1 cache). The DCU 574 may handle multiple outstanding cache misses and continue to service incoming stores and loads. It also supports maintaining cache coherency. The data TLB unit 572 is a cache used to improve virtual address translation speed by mapping virtual and physical address spaces. In one exemplary embodiment, the memory access units 564 may include a load unit, a store address unit, and a store data unit, each of which is coupled to the data TLB unit 572 in the memory unit 570. The L2 cache unit 576 may be coupled to one or more other levels of cache and eventually to a main memory.

In one embodiment, the data prefetcher 580 speculatively loads/prefetches data to the DCU 574 by automatically predicting which data a program is about to consume. Prefetching may refer to transferring data stored in one memory location of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 500 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 5B is a block diagram illustrating an in-order pipeline and a register renaming stage, out-of-order issue/execution pipeline implemented by processing device 500 of FIG. 5A according to some embodiments of the disclosure. The solid lined boxes in FIG. 5B illustrate an in-order pipeline, while the dashed lined boxes illustrates a register renaming, out-of-order issue/execution pipeline. In FIG. 5B, a processor pipeline 500 includes a fetch stage 502, a length decode stage 504, a decode stage 506, an allocation stage 508, a renaming stage 510, a scheduling (also known as a dispatch or issue) stage 512, a register read/memory read stage 514, an execute stage 516, a write back/memory write stage 518, an exception handling stage 522, and a commit stage 524. In some embodiments, the ordering of stages 502-524 may be different than illustrated and are not limited to the specific ordering shown in FIG. 5B.

Figure 6:
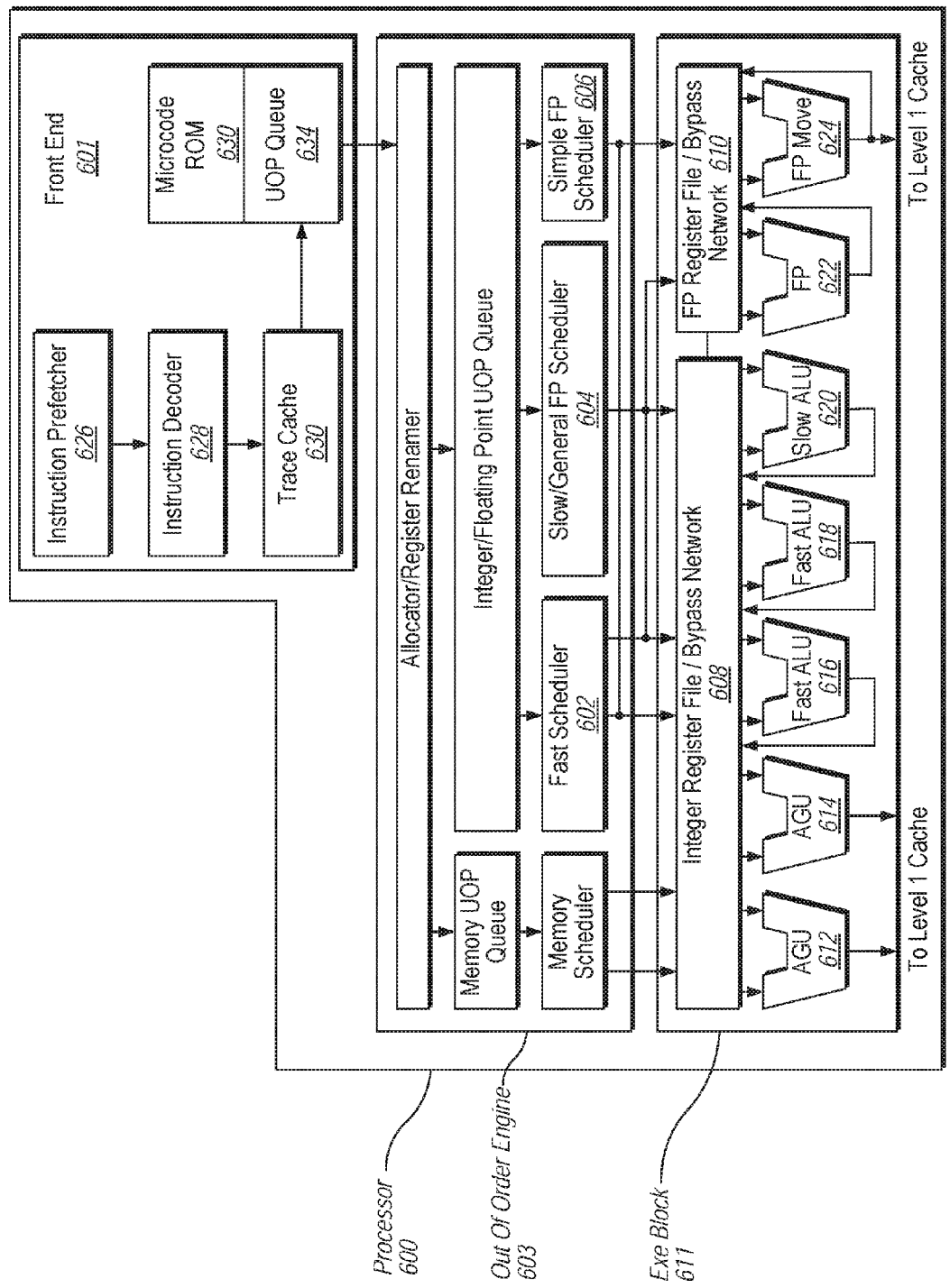
FIG. 6 illustrates a block diagram of the micro-architecture for a processor that includes logic in accordance with one embodiment of the disclosure.

FIG. 6 illustrates a block diagram of the micro-architecture for a processor 600 that includes hybrid cores in accordance with one embodiment of the disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 601 is the part of the processor 600 that fetches instructions to be executed and prepares them to be used later in the processor pipeline.

The front end 601 may include several units. In one embodiment, the instruction prefetcher 626 fetches instructions from memory and feeds them to an instruction decoder 628 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 630 takes decoded uops and assembles them into program ordered sequences or traces in the uop queue 634 for execution. When the trace cache 630 encounters a complex instruction, the microcode ROM 632 provides the uops needed to complete the operation.

Some instructions are converted into a single micro-op, whereas others need several micro-ops to complete the full operation. In one embodiment, if more than four micro-ops are needed to complete an instruction, the decoder 628 accesses the microcode ROM 632 to do the instruction. For one embodiment, an instruction can be decoded into a small number of micro ops for processing at the instruction decoder 628. In another embodiment, an instruction can be stored within the microcode ROM 632 should a number of micro-ops be needed to accomplish the operation. The trace cache 630 refers to an entry point programmable logic array (PLA) to determine a correct micro-instruction pointer for reading the micro-code sequences to complete one or more instructions in accordance with one embodiment from the micro-code ROM 632. After the microcode ROM 632 finishes sequencing micro-ops for an instruction, the front end 601 of the machine resumes fetching micro-ops from the trace cache 630.

The out-of-order execution engine 603 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register file. The allocator also allocates an entry for each uop in one of the two uop queues, one for memory operations and one for non-memory operations, in front of the instruction schedulers: memory scheduler, fast scheduler 602, slow/general floating point scheduler 604, and simple floating point scheduler 606. The uop schedulers 602, 604, 606, determine when a uop is ready to execute based on the readiness of their dependent input register operand sources and the availability of the execution resources the uops need to complete their operation. The fast scheduler 602 of one embodiment can schedule on each half of the main clock cycle while the other schedulers can only schedule once per main processor clock cycle. The schedulers arbitrate for the dispatch ports to schedule uops for execution.

Register files 608, 610, sit between the schedulers 602, 604, 606, and the execution units 612, 614, 616, 618, 620, 622, 624 in the execution block 611. There is a separate register file 608, 610, for integer and floating point operations, respectively. Each register file 608, 610, of one embodiment also includes a bypass network that can bypass or forward just completed results that have not yet been written into the register file to new dependent uops. The integer register file 608 and the floating point register file 610 are also capable of communicating data with the other. For one embodiment, the integer register file 608 is split into two separate register files, one register file for the low order 32 bits of data and a second register file for the high order 32 bits of data. The floating point register file 610 of one embodiment has 128 bit wide entries because floating point instructions typically have operands from 64 to 128 bits in width.

The execution block 611 contains the execution units 612, 614, 616, 618, 620, 622, 624, where the instructions are actually executed. This section includes the register files 608, 610, that store the integer and floating point data operand values that the micro-instructions need to execute. The processor 600 of one embodiment is comprised of a number of execution units: address generation unit (AGU) 612, AGU 614, fast ALU 616, fast ALU 618, slow ALU 620, floating point ALU 622, floating point move unit 624. For one embodiment, the floating point execution blocks 622, 624, execute floating point, MMX, SIMD, and SSE, or other operations. The floating point ALU 622 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 616, 618. The fast ALUs 616, 618, of one embodiment can execute fast operations with an effective latency of half a clock cycle. For one embodiment, most complex integer operations go to the slow ALU 620 as the slow ALU 620 includes integer execution hardware for long latency type of operations, such as a multiplier, shifts, flag logic, and branch processing. Memory load/store operations are executed by the AGUs 612, 614. For one embodiment, the integer ALUs 616, 618, 620, are described in the context of performing integer operations on 64 bit data operands. In alternative embodiments, the ALUs 616, 618, 620, can be implemented to support a variety of data bits including 16, 32, 128, 256, etc. Similarly, the floating point units 622, 624, can be implemented to support a range of operands having bits of various widths. For one embodiment, the floating point units 622, 624, can operate on 128 bits wide packed data operands in conjunction with SIMD and multimedia instructions.

In one embodiment, the uops schedulers 602, 604, 606, dispatch dependent operations before the parent load has finished executing. As uops are speculatively scheduled and executed in processor 600, the processor 600 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The processor 600 also includes logic to implement store address prediction for memory disambiguation according to embodiments of the disclosure. In one embodiment, the execution block 611 of processor 600 may include a store address predictor (not shown) for implementing store address prediction for memory disambiguation.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store thirty-two bit integer data. A register file of one embodiment also contains eight multimedia SIMD registers for packed data.

For the discussions below, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register file or different register files. Furthermore, in one embodiment, floating point and integer data may be stored in different registers or the same registers.

Figure 7:
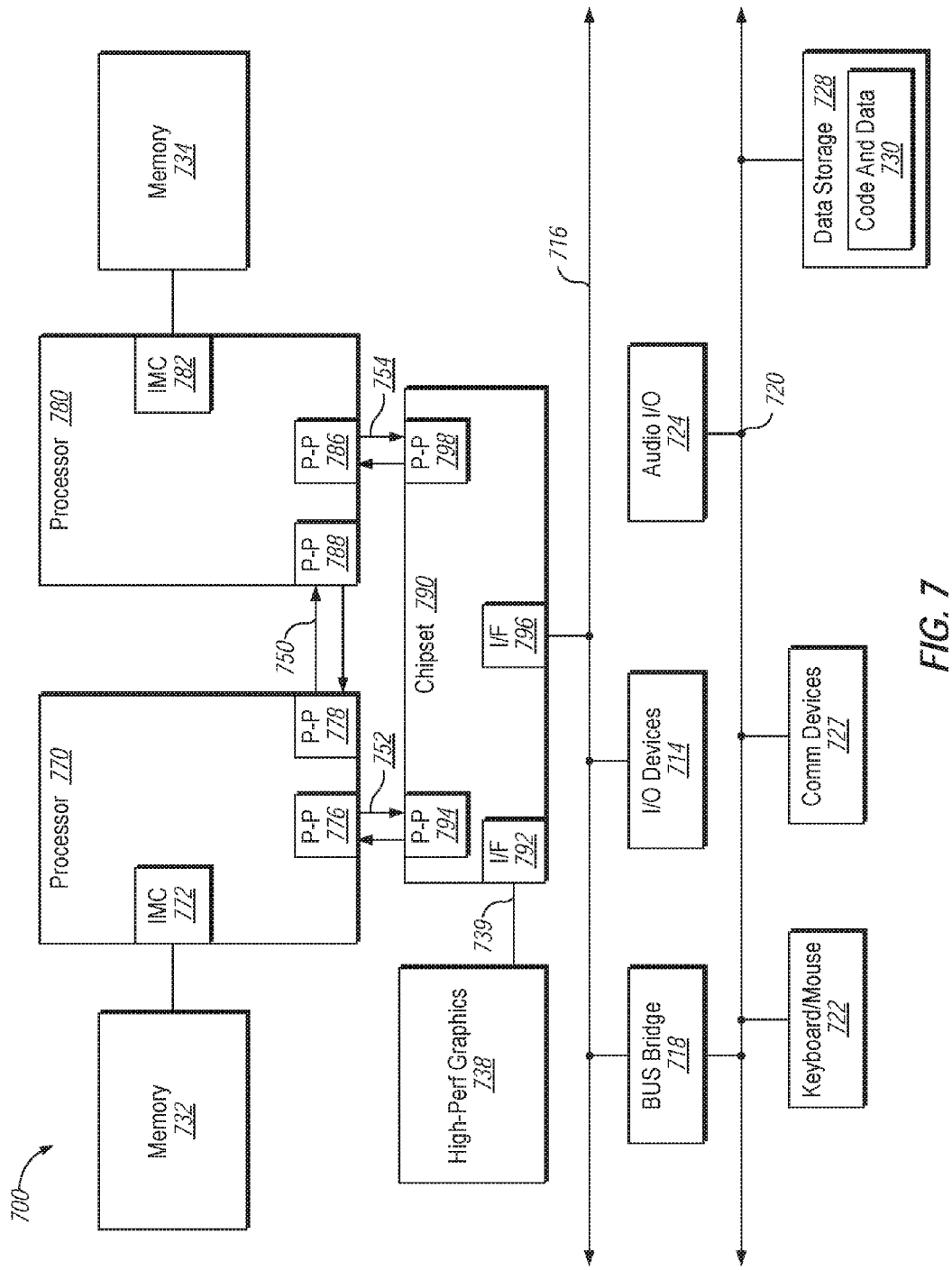
FIG. 7 is a block diagram illustrating a system in which an embodiment of the disclosure may be used.

Referring now to FIG. 7, shown is a block diagram illustrating a system 700 in which an embodiment of the disclosure may be used. As shown in FIG. 7, multiprocessor system 700 is a point-to-point interconnect system, and includes a first processor 770 and a second processor 780 coupled via a point-to-point interconnect 750. While shown with only two processors 770, 780, it is to be understood that the scope of embodiments of the disclosure is not so limited. In other embodiments, one or more additional processors may be present in a given processor. In one embodiment, the multiprocessor system 700 may implement hybrid cores as described herein.

Processors 770 and 780 are shown including integrated memory controller units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may also exchange information with a high-performance graphics circuit 738 via a high-performance graphics interface 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures are possible. For example, instead of the point-to-point architecture of FIG. 7, a system may implement a multi-drop bus or other such architecture.

Figure 8:
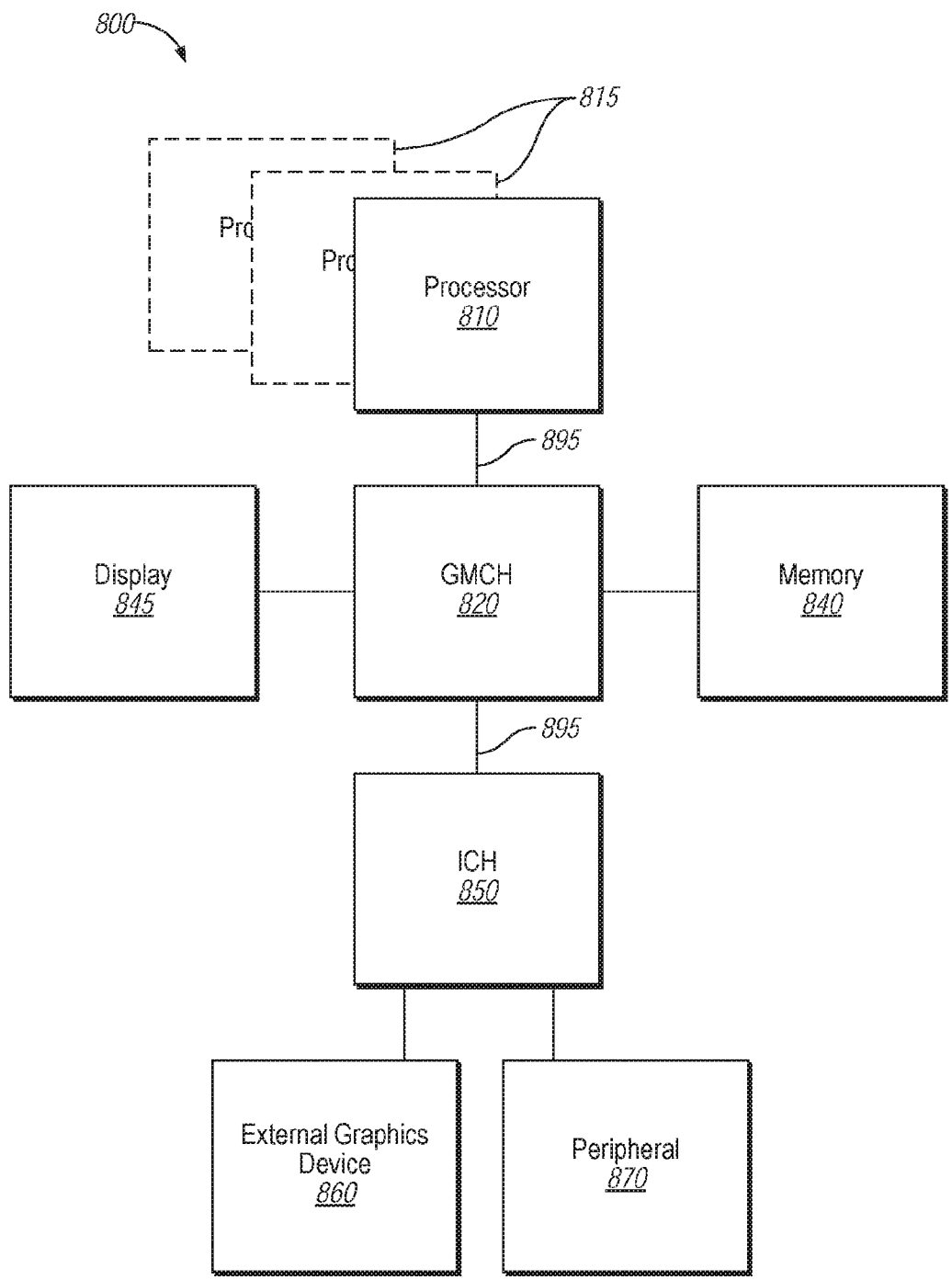
FIG. 8 is a block diagram of a system in which an embodiment of the disclosure may operate.

Referring now to FIG. 8, shown is a block diagram of a system 800 in which one embodiment of the disclosure may operate. The system 800 may include one or more processors 810, 815, which are coupled to graphics memory controller hub (GMCH) 820. The optional nature of additional processors 815 is denoted in FIG. 8 with broken lines. In one embodiment, processors 810, 815 implement hybrid cores according to embodiments of the disclosure.

Each processor 810, 815 may be some version of the circuit, integrated circuit, processor, and/or silicon integrated circuit as described above. However, it should be noted that it is unlikely that integrated graphics logic and integrated memory control units would exist in the processors 810, 815. FIG. 8 illustrates that the GMCH 820 may be coupled to a memory 840 that may be, for example, a dynamic random access memory (DRAM). The DRAM may, for at least one embodiment, be associated with a non-volatile cache.

The GMCH 820 may be a chipset, or a portion of a chipset. The GMCH 820 may communicate with the processor(s) 810, 815 and control interaction between the processor(s) 810, 815 and memory 840. The GMCH 820 may also act as an accelerated bus interface between the processor(s) 810, 815 and other elements of the system 800. For at least one embodiment, the GMCH 820 communicates with the processor(s) 810, 815 via a multi-drop bus, such as a frontside bus (FSB) 895.

Furthermore, GMCH 820 is coupled to a display 845 (such as a flat panel or touchscreen display). GMCH 820 may include an integrated graphics accelerator. GMCH 820 is further coupled to an input/output (I/O) controller hub (ICH) 850, which may be used to couple various peripheral devices to system 800. Shown for example in the embodiment of FIG. 8 is an external graphics device 860, which may be a discrete graphics device, coupled to ICH 850, along with another peripheral device 870.

Alternatively, additional or different processors may also be present in the system 800. For example, additional processor(s) 815 may include additional processors(s) that are the same as processor 810, additional processor(s) that are heterogeneous or asymmetric to processor 810, accelerators (such as, e.g., graphics accelerators or digital signal processing (DSP) units), field programmable gate arrays, or any other processor. There can be a variety of differences between the processor(s) 810, 815 in terms of a spectrum of metrics of merit including architectural, micro-architectural, thermal, power consumption characteristics, and the like. These differences may effectively manifest themselves as asymmetry and heterogeneity amongst the processors 810, 815. For at least one embodiment, the various processors 810, 815 may reside in the same die package.

Figure 9:
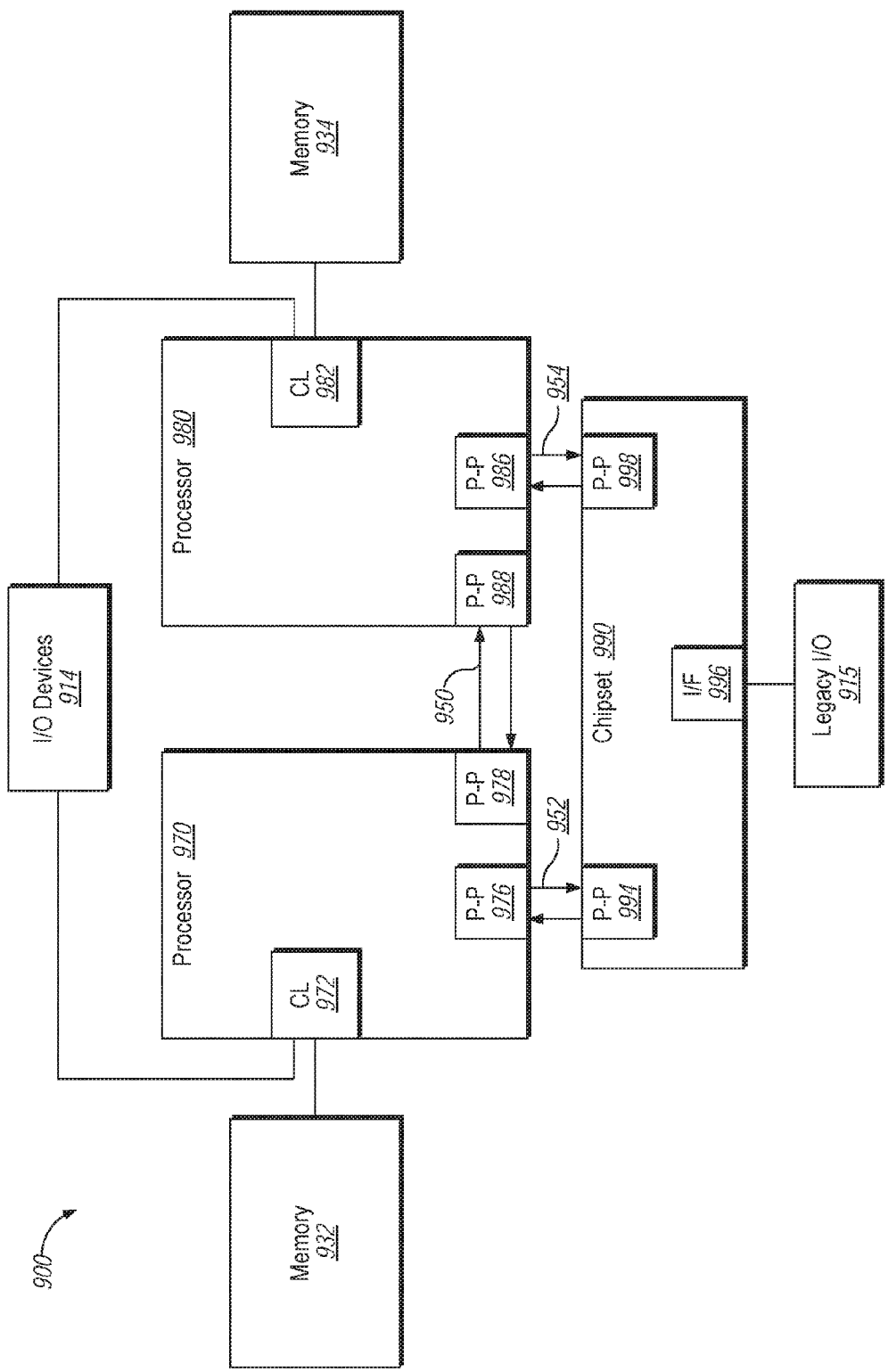
FIG. 9 is a block diagram of a system in which an embodiment of the disclosure may operate.

Referring now to FIG. 9, shown is a block diagram of a system 900 in which an embodiment of the disclosure may operate. FIG. 9 illustrates processors 970, 980. In one embodiment, processors 970, 980 may implement hybrid cores as described above. Processors 970, 980 may include integrated memory and I/O control logic ("CL") 972 and 982, respectively and intercommunicate with each other via point-to-point interconnect 950 between point-to-point (P-P) interfaces 978 and 988 respectively. Processors 970, 980 each communicate with chipset 990 via point-to-point interconnects 952 and 954 through the respective P-P interfaces 976 to 994 and 986 to 998 as shown. For at least one embodiment, the CL 972, 982 may include integrated memory controller units. CLs 972, 982 may include I/O control logic. As depicted, memories 932, 934 coupled to CLs 972, 982 and I/O devices 914 are also coupled to the control logic 972, 982. Legacy I/O devices 915 are coupled to the chipset 990 via interface 996.

Figure 10:
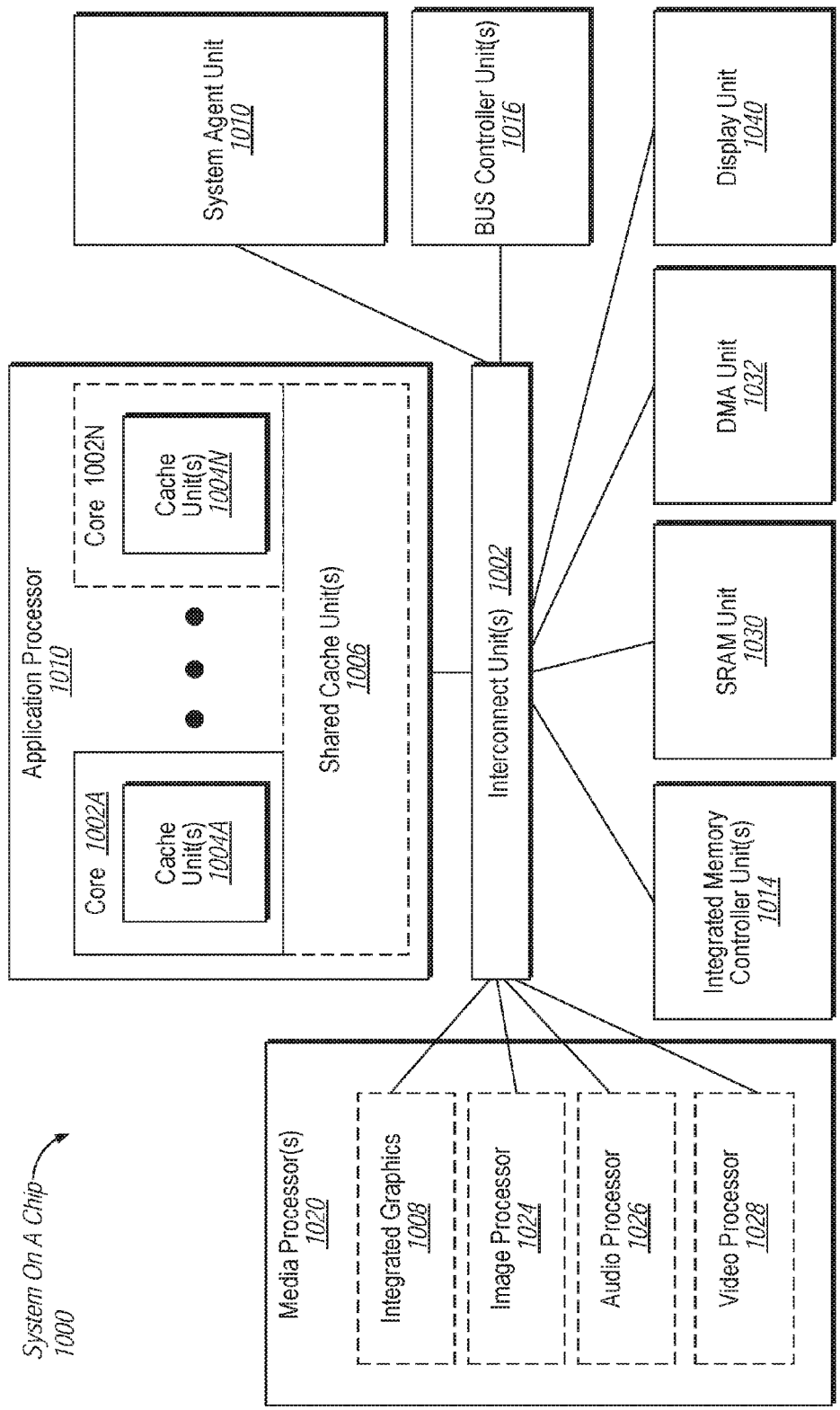
FIG. 10 is a block diagram of a System-on-a-Chip (SoC) in accordance with an embodiment of the present disclosure

Embodiments may be implemented in many different system types. FIG. 10 is a block diagram of a SoC 1000 in accordance with an embodiment of the present disclosure. Dashed lined boxes are optional features on more advanced SoCs. In FIG. 10, an interconnect unit(s) 1012 is coupled to: an application processor 1020 which includes a set of one or more cores 1002A-N and shared cache unit(s) 1006; a system agent unit 1010; a bus controller unit(s) 1016; an integrated memory controller unit(s) 1014; a set or one or more media processors 1018 which may include integrated graphics logic 1008, an image processor 1024 for providing still and/or video camera functionality, an audio processor 1026 for providing hardware audio acceleration, and a video processor 1028 for providing video encode/decode acceleration; an static random access memory (SRAM) unit 1030; a direct memory access (DMA) unit 1032; and a display unit 1040 for coupling to one or more external displays. In one embodiment, a memory module may be included in the integrated memory controller unit(s) 1014. In another embodiment, the memory module may be included in one or more other components of the SoC 1000 that may be used to access and/or control a memory. The application processor 1020 may include a store address predictor for implementing hybrid cores as described in embodiments herein.

The memory hierarchy includes one or more levels of cache within the cores, a set or one or more shared cache units 1006, and external memory (not shown) coupled to the set of integrated memory controller units 1014. The set of shared cache units 1006 may include one or more mid-level caches, such as level 2 (L2), level 3 (L3), level 4 (L4), or other levels of cache, a last level cache (LLC), and/or combinations thereof.

In some embodiments, one or more of the cores 1002A-N are capable of multi-threading. The system agent 1010 includes those components coordinating and operating cores 1002A-N. The system agent unit 1010 may include for example a power control unit (PCU) and a display unit. The PCU may be or include logic and components needed for regulating the power state of the cores 1002A-N and the integrated graphics logic 1008. The display unit is for driving one or more externally connected displays.

The cores 1002A-N may be homogenous or heterogeneous in terms of architecture and/or instruction set. For example, some of the cores 1002A-N may be in order while others are out-of-order. As another example, two or more of the cores 1002A-N may be capable of execution the same instruction set, while others may be capable of executing only a subset of that instruction set or a different instruction set.

The application processor 1020 may be a general-purpose processor, such as a Core™ i3, i5, i7, 2 Duo and Quad, Xeon™, Itanium™, Atom™ or Quark™ processor, which are available from Intel™ Corporation, of Santa Clara, Calif. Alternatively, the application processor 1020 may be from another company, such as ARM Holdings™, Ltd, MIPS™, etc. The application processor 1020 may be a special-purpose processor, such as, for example, a network or communication processor, compression engine, graphics processor, co-processor, embedded processor, or the like. The application processor 1020 may be implemented on one or more chips. The application processor 1020 may be a part of and/or may be implemented on one or more substrates using any of a number of process technologies, such as, for example, BiCMOS, CMOS, or NMOS.

Figure 11:
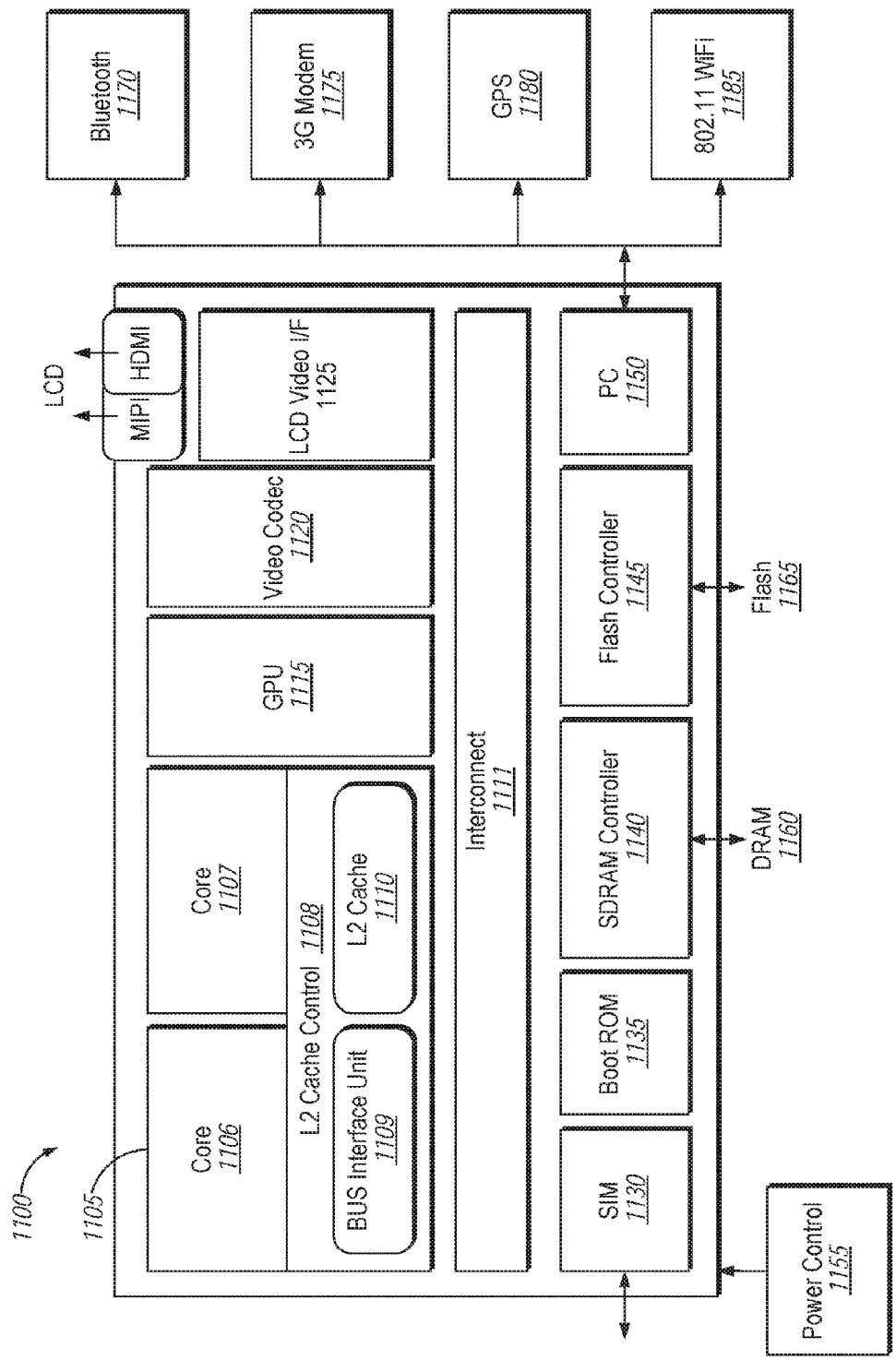
FIG. 11 is a block diagram of an embodiment of an SoC design in accordance with the present disclosure.

FIG. 11 is a block diagram of an embodiment of a system on-chip (SoC) design in accordance with the present disclosure. As a specific illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1100 includes 2 cores—1106 and 1107. Cores 1106 and 1107 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1110 includes an on-chip interconnect, such as an IOSF, AMBA, or other interconnect discussed above, which potentially implements one or more aspects of the described disclosure. In one embodiment, cores 1106, 1107 may implement hybrid cores as described in embodiments herein.

Interconnect 1110 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the disclosure described herein. In addition, the system 1100 illustrates peripherals for communication, such as a Bluetooth module 1170, 3G modem 1175, GPS 1180, and Wi-Fi 1185.

Figure 12:
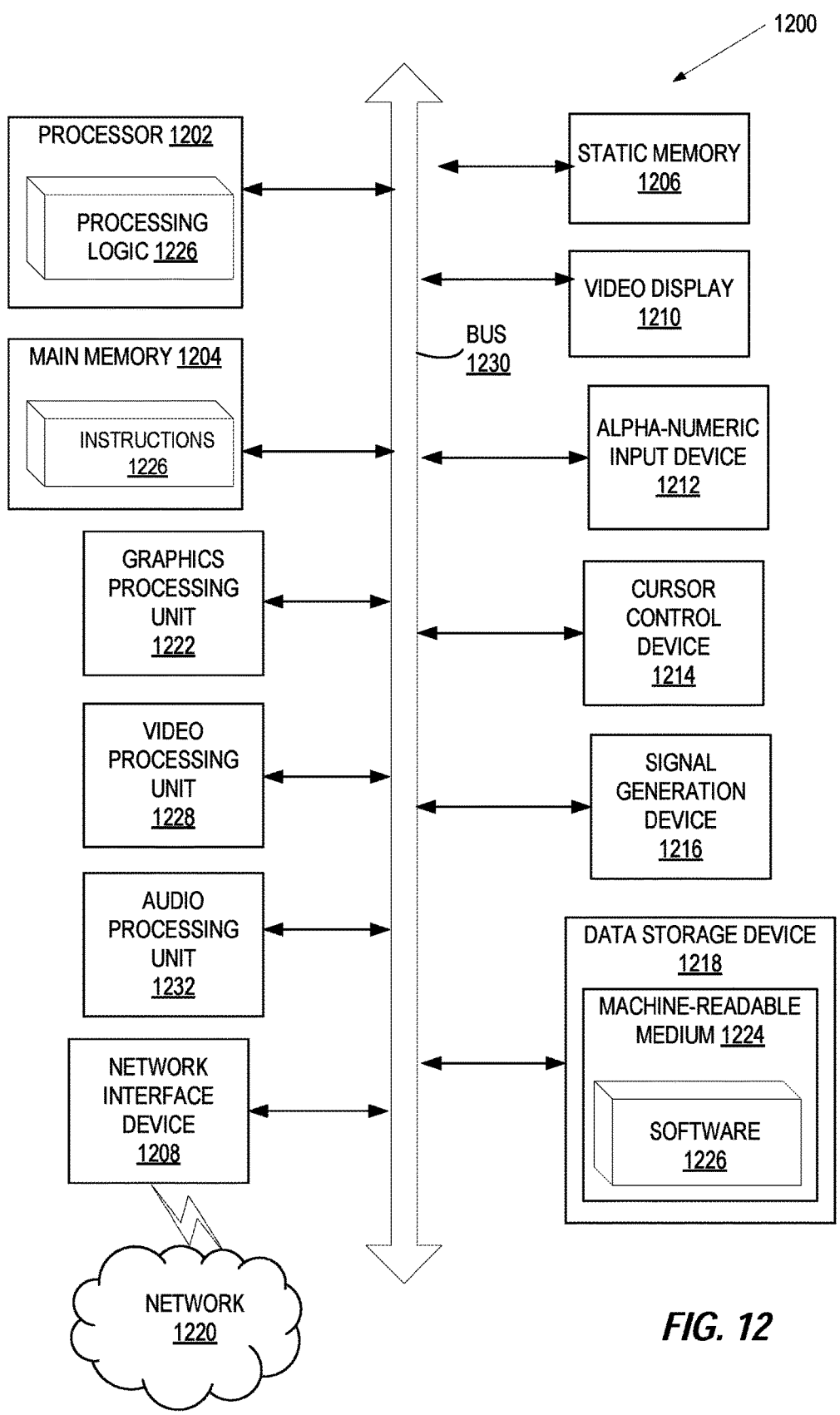
FIG. 12 illustrates a block diagram of one embodiment of a computer system.

FIG. 12 illustrates a diagrammatic representation of a machine in the example form of a computer system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The computer system 1200 includes a processing device 1202, a main memory 1204 (e.g., read-only memory (ROM), flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1218, which communicate with each other via a bus 1230.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application specific integrated circuit (ASIC), a field programmable gate array (FPGA), a digital signal processor (DSP), network processor, or the like. In one embodiment, processing device 1202 may include one or processing cores. The processing device 1202 is configured to execute the processing logic 1226 for performing the operations and steps discussed herein. In one embodiment, processing device 1202 is the same as processor system 100 described with respect to FIG. 1A as described herein with embodiments of the disclosure.

The computer system 1200 may further include a network interface device 1208 communicably coupled to a network 1220. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse), and a signal generation device 1216 (e.g., a speaker). Furthermore, computer system 1200 may include a graphics processing unit 1222, a video processing unit 1228, and an audio processing unit 1232.

The data storage device 1218 may include a machine-accessible storage medium 1224 on which is stored software 1226 implementing any one or more of the methodologies of functions described herein, such as implementing store address prediction for memory disambiguation as described above. The software 1226 may also reside, completely or at least partially, within the main memory 1204 as instructions 1226 and/or within the processing device 1202 as processing logic 1226 during execution thereof by the computer system 1200; the main memory 1204 and the processing device 1202 also constituting machine-accessible storage media.

The machine-readable storage medium 1224 may also be used to store instructions 1226 implementing store address prediction for hybrid cores such as described according to embodiments of the disclosure. While the machine-accessible storage medium 1128 is shown in an example embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instruction for execution by the machine and that cause the machine to perform any one or more of the methodologies of the present disclosure. The term "machine-accessible storage medium" shall accordingly be taken to include, but not be limited to, solid-state memories, and optical and magnetic media.

The following examples pertain to further embodiments. Example 1 is a processor including a processing core to execute an application comprising instructions encoding a transaction with a persistent memory via a near memory cache, wherein the near memory cache comprises a cache line comprising an identifier associated with the transaction and a status flag indicating whether the cache line is committed or uncommitted, and a cache controller operatively coupled to the near memory cache to determine, based on the status flag, what operation is to be performed with respect to contents of the cache line.

In Example 2, the subject matter of Example 1 can optionally provide that the processing core is to execute a system call to a kernel to acquire a transaction identifier prior to executing the transaction begin instruction and to store the transaction identifier in a transaction identifier register, and wherein the processing core is further to copy the transaction identifier to the cache line to associate the cache line with the transaction.

In Example 3, the subject matter of any Examples 1 and 2 can optionally provide that the processing core is to execute a system call to a kernel to acquire a transaction identifier prior to executing the transaction begin instruction and to store the transaction identifier in a transaction identifier register, and wherein the processing core is further to copy the transaction identifier to the cache line to associate the cache line with the transaction.

In Example 4, the subject matter of Example 3 can optionally provide that the cache controller comprises a hash table referencing a plurality of dirty cache lines for a plurality of transactions whose contents are different from data stored in a corresponding location of the persistent memory.

In Example 5, the subject matter of Example 4 can optionally provide that in response to detecting a failure event, the cache controller is to in response to determining that a value of the status flag indicates that the cache line is committed, evict contents of the cache line to the persistent memory, and in response to determining the value of the status flag indicates that the cache line is uncommitted, discard the contents of the cache line, wherein, in response to the failure event, the processing core is to execute an abort instruction, and wherein executing the abort instruction comprises transmitting an abort message comprising the transaction identifier to the cache controller.

In Example 6, the subject matter of Example 5 can optionally provide that in response to receiving the abort message, the cache controller is to identify and invalidate the plurality of dirty cache lines for the plurality of transactions based on the hash table.

In Example 7, the subject matter of any of Examples 1 and 2 can optionally provide that in response to detecting the transaction begin instruction, the cache controller is to assign the cache line a free state.

In Example 8, the subject matter of any of Examples 1 and 2 can optionally provide that in response to detecting a write to a location in the persistent memory by a second transaction, the cache controller is to assign the cache line the uncommitted state.

In Example 9, the subject matter of any of Examples 1 and 2 can optionally provide that in response to detecting the transaction end instruction, the cache controller is to assign atomically the committed state to the cache line.

In Example 10, the subject matter of any of Examples 1 and 2 can optionally provide that in response to detecting a cache eviction event, the cache controller is to identify a plurality of cache lines whose cache line status flags do not indicate the uncommitted state and evict contents of the plurality of cache lines to the persistent memory.

In Example 11, the subject matter of Example 1 can optionally provide that in response to detecting an overflow of cache lines in the cache, the cache controller is to evict at least one cache line to the persistent memory.

In Example 12, the subject matter of any of Examples 1 and 11 can optionally provide that the cache controller is further to select the cache line to be evicted according to a policy of resource usage.

In Example 13, the subject matter of any of Examples 1 and 11 can optionally provide that the persistent memory comprises a data log comprising at least one of a redo log or an undo log.

In Example 14, the subject matter of any of Examples 1 and 11 can further include a memory controller, wherein, in response to detecting a transaction end instruction, the cache controller is to instruct the memory controller to commit the evicted at least one cache line in the persistent memory.

In Example 15, the subject matter of Example 1 can optionally provide that the near memory cache is part of a near memory of a two-level memory system, and the persistent memory is part of a far memory of the two-level memory system.

In Example 16, the subject matter of Example 1 can optionally provide that the near memory cache is a last level cache (LLC) associated with the processor, and the persistent memory is part of a far memory of a one-level memory system.

Example 17 is a system-on-a-chip (SoC) including a two-level memory comprising a first level comprising a near memory cache, and a second level comprising a persistent memory and a processor, operatively coupled to the two-level memory, comprising a processing core to execute an application comprising instructions encoding a transaction with the persistent memory via the near memory cache, wherein the near memory cache comprises a cache line comprising an identifier associated with the transaction and a status flag indicating whether the cache line is committed or uncommitted and a cache controller operatively coupled to the near memory cache to determine, based on the status flag, what operation is to be performed with respect to contents of the cache line.

In Example 18, the subject matter of Example 17 can optionally provide that in response to detecting a failure event, the cache controller is to in response to determining a value of the status flag being one of committed or free, evict data stored in the cache line to the persistent memory, and in response to determining that the value of the status flag associated with the cache line is uncommitted, discard the cache line.

In Example 19, the subject matter of any of Examples 17 and 18 can optionally provide that the processing core is to execute a system call to a kernel of an operating system to acquire the transaction identifier prior to executing the transaction begin instruction.

In Example 20, the subject matter of any of Examples 17 and 18 can optionally provide that the cache controller comprises a hash table referencing a plurality of dirty cache lines whose contents are different from data stored in a correspondingly location of the persistent memory.

Example 21 is method including executing, by a processing core, an application comprising instructions encoding a transaction with a persistent memory via a near memory cache, wherein the near memory cache comprises a cache line comprising an identifier associated with the transaction and a status flag indicating whether the cache line is committed or uncommitted, detecting a failure event occurred associated with the transaction, wherein the failure event requires a reboot of a system that the processing core supports, and determining, based on the status flag, what operation is to be performed with respect to contents of the cache line.

In Example 22, the subject matter of Example 21 can further include in response to determining that a value of the status flag of the cache line indicates a committed state, evicting contents of the cache line to the persistent memory, and in response to determining that the value of the status flag of the cache line indicates an uncommitted state, discarding the contents of the cache line.

In Example 23, the subject matter of any of Examples 21 and 22 can further include executing a system call to a kernel to acquire a transaction identifier prior to executing the transaction begin instruction, storing the transaction identifier in a transaction identifier register of the processor, and copying the transaction identifier to the cache line to associate the cache line with the transaction.

Example 24 is an apparatus including means for performing the method of any of Examples 21 to 23.

Example 25 is a machine-readable non-transitory medium having stored thereon program codes that, when executed, perform operations including executing, by a processing core, an application comprising instructions encoding a transaction with a persistent memory via a near memory cache, wherein the near memory cache comprises a cache line comprising an identifier associated with the transaction and a status flag indicating whether the cache line is committed or uncommitted, detecting a failure event occurred associated with the transaction, wherein the failure event requires a reboot of a system that the processing core supports, and determining, based on the status flag, what operation is to be performed with respect to contents of the cache line.

In Example 26, the subject matter of Example 25 can optionally provide that the operations further include further include in response to determining that a value of the status flag of the cache line indicates a committed state, evicting contents of the cache line to the persistent memory, and in response to determining that the value of the status flag of the cache line indicates an uncommitted state, discarding the contents of the cache line.

In Example 27, the subject matter of any of Examples 24 to 26 can further include executing a system call to a kernel to acquire a transaction identifier prior to executing the transaction begin instruction, storing the transaction identifier in a transaction identifier register of the processor, and copying the transaction identifier to the cache line to associate the cache line with the transaction.

While the disclosure has been described with respect to a limited number of embodiments, those skilled in the art will appreciate numerous modifications and variations there from. It is intended that the appended claims cover all such modifications and variations as fall within the true spirit and scope of this disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 910 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A processor comprising:
  a processing core to:
    execute an application comprising instructions encoding a transaction with a persistent memory via a near memory cache, wherein the near memory cache comprises a cache line comprising an identifier associated with the transaction and a status flag indicating whether the cache line is in a committed state or an uncommitted state; and
    execute a transaction begin instruction to initiate the transaction, and a transaction end instruction to conclude the transaction; and
  a cache controller operatively coupled to the near memory cache to determine, based on the status flag, what operation is to be performed with respect to contents of the cache line.

2. The processor of claim 1, wherein the processing core is to execute a system call to a kernel to acquire a transaction identifier prior to executing the transaction begin instruction and to store the transaction identifier in a transaction identifier register, and wherein the processing core is further to copy the transaction identifier to the cache line to associate the cache line with the transaction.

3. The processor of claim 2, wherein the cache controller comprises a hash table referencing a plurality of dirty cache lines for a plurality of transactions whose contents are different from data stored in a corresponding location of the persistent memory.

4. The processor of claim 3, wherein in response to detecting a failure event, the cache controller is to:
  in response to determining that a value of the status flag indicates that the cache line is committed, evict contents of the cache line to the persistent memory; and
  in response to determining the value of the status flag indicates that the cache line is uncommitted, discard the contents of the cache line, wherein, in response to the failure event, the processing core is to execute an abort instruction, and wherein executing the abort instruction comprises transmitting an abort message comprising the transaction identifier to the cache controller.

5. The processor of claim 4, wherein in response to receiving the abort message, the cache controller is to identify and invalidate the plurality of dirty cache lines for the plurality of transactions based on the hash table.

6. The processor of claim 1, wherein in response to detecting the transaction begin instruction, the cache controller is to assign the cache line a free state.

7. The processor of claim 1, wherein in response to detecting a write to a location in the persistent memory by a second transaction, the cache controller is to assign the cache line the uncommitted state.

8. The processor of claim 1, wherein in response to detecting the transaction end instruction, the cache controller is to assign atomically the committed state to the cache line.

9. The processor of claim 1, wherein in response to detecting a cache eviction event, the cache controller is to identify a plurality of cache lines whose cache line status flags do not indicate the uncommitted state and evict contents of the plurality of cache lines to the persistent memory.

10. The processor of claim 1, wherein in response to detecting an overflow of cache lines in the cache, the cache controller is to evict at least one cache line to the persistent memory.

11. The processor of claim 10, wherein the cache controller is further to select the cache line to be evicted according to a policy of resource usage.

12. The processor of claim 10, wherein the persistent memory comprises a data log comprising at least one of a redo log or an undo log.

13. The processor of claim 10, further comprising a memory controller, wherein, in response to detecting a transaction end instruction, the cache controller is to instruct the memory controller to commit the evicted at least one cache line in the persistent memory.

14. The processor of claim 1, wherein the near memory cache is part of a near memory of a two-level memory system, and the persistent memory is part of a far memory of the two-level memory system.

15. The processor of claim 1, wherein the near memory cache is a last level cache (LLC) associated with the processor, and the persistent memory is part of a far memory of a one-level memory system.

16. A system-on-a-chip (SoC) comprising:
a two-level memory comprising a first level comprising a near memory cache, and a second level comprising a persistent memory, and
a processor, operatively coupled to the two-level memory, comprising:
  a processing core to:
    execute an application comprising instructions encoding a transaction with the persistent memory via the near memory cache, wherein the near memory cache comprises a cache line comprising an identifier associated with the transaction and a status flag indicating whether the cache line is committed or uncommitted; and
    execute a transaction begin instruction to initiate the transaction, and a transaction end instruction to conclude the transaction; and
  a cache controller operatively coupled to the near memory cache to determine, based on the status flag, what operation is to be performed with respect to contents of the cache line.

17. The SoC of claim 16, wherein in response to detecting a failure event, the cache controller is to:
in response to determining a value of the status flag being one of committed or free, evict data stored in the cache line to the persistent memory, and
in response to determining that the value of the status flag associated with the cache line is uncommitted, discard the cache line.

18. The SoC of claim 17, wherein the processing core is to execute a system call to a kernel of an operating system to acquire the identifier associated with the transaction prior to executing the transaction begin instruction.

19. The SoC of claim 17, wherein the cache controller comprises a hash table referencing a plurality of dirty cache lines whose contents are different from data stored in a correspondingly location of the persistent memory.

20. A method comprising:
executing, by a processing core, an application comprising instructions encoding a transaction with a persistent memory via a near memory cache, wherein the near memory cache comprises a cache line comprising an identifier associated with the transaction and a status flag indicating whether the cache line is committed or uncommitted;
detecting a failure event occurred associated with the transaction, wherein the failure event requires a reboot of a system that the processing core supports; and
determining, based on the status flag, what operation is to be performed with respect to contents of the cache line.

21. The method of claim 20, further comprising:
in response to determining that a value of the status flag of the cache line indicates a committed state, evicting contents of the cache line to the persistent memory; and
in response to determining that the value of the status flag of the cache line indicates an uncommitted state, discarding the contents of the cache line.

22. The method of claim 21, further comprising:
executing a system call to a kernel to acquire a transaction identifier prior to executing the transaction begin instruction;
storing the transaction identifier in a transaction identifier register of the processor; and
copying the transaction identifier to the cache line to associate the cache line with the transaction.

* * * * *